(12) United States Patent
Okubo et al.

(10) Patent No.: US 10,507,883 B2
(45) Date of Patent: Dec. 17, 2019

(54) BICYCLE OPERATING DEVICE

(71) Applicant: SHIMANO INC., Sakai (JP)

(72) Inventors: Kazunori Okubo, Sakai (JP); Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 282 days.

(21) Appl. No.: 15/417,223

(22) Filed: Jan. 27, 2017

(65) Prior Publication Data

US 2018/0215438 A1   Aug. 2, 2018

(51) Int. Cl.
   *B62K 23/06*   (2006.01)
   *B62L 3/02*    (2006.01)
   *B62M 25/04*   (2006.01)

(52) U.S. Cl.
   CPC ............ *B62K 23/06* (2013.01); *B62L 3/023* (2013.01); *B62M 25/04* (2013.01)

(58) Field of Classification Search
   CPC ........ B62K 23/06; B62K 23/02; B62M 25/04; B62M 25/02; B62L 3/02; B62L 3/023; B62L 3/026
   See application file for complete search history.

(56) References Cited

U.S. PATENT DOCUMENTS

| 6,957,597 | B2 | 10/2005 | Irie et al. | |
| 2014/0174235 | A1* | 6/2014 | Watarai | B62M 25/04 74/473.14 |
| 2015/0001018 | A1* | 1/2015 | Kariyama | B62L 3/023 188/344 |

FOREIGN PATENT DOCUMENTS

| DE | 202014100854 U1 * | 6/2014 | ............ B62K 23/06 |
| DE | 202015002728 U1 * | 8/2015 | ................ B62L 3/02 |

OTHER PUBLICATIONS

Machine Translation of DE 20 2015 002 728, obtained Dec. 20, 2018.*
Machine Translation of DE 20 2014 100 854, obtained Dec. 26, 2018.*

* cited by examiner

*Primary Examiner* — Richard W Ridley
*Assistant Examiner* — Brian J McGovern
(74) *Attorney, Agent, or Firm* — Mori & Ward, LLP

(57) ABSTRACT

A bicycle operating device comprises a base structure, an operating member, an adjustment member, a receiving member, and an elastic member. The adjustment member is attached to one of the base structure and the operating member to change a rest position of the operating member relative to the base structure. The receiving member is provided to the other of the operating member and the base structure to be movable with the adjustment member in response to a pivotal movement of the operating member relative to the base structure. The elastic member is provided between the adjustment member and the receiving member to keep a clearance between the adjustment member and the receiving member in a rest state where the operating member is in the rest position.

21 Claims, 20 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base structure, an operating member, an adjustment member, a receiving member, and an elastic member. The operating member is pivotally coupled to the base structure about a pivot axis. The operating member is pivotable relative to the base structure about the pivot axis between a rest position and an operated position. The adjustment member is attached to one of the base structure and the operating member to change the rest position of the operating member relative to the base structure. The receiving member is provided to the other of the operating member and the base structure to be movable with the adjustment member in response to a pivotal movement of the operating member relative to the base structure. The elastic member is provided between the adjustment member and the receiving member to keep a clearance between the adjustment member and the receiving member in a rest state where the operating member is in the rest position.

With the bicycle operating device according to the first aspect, the elastic member reduces noise caused by an intermittent contact between the adjustment member and the receiving member under vibration of the bicycle operating device.

In accordance with a second aspect of the present invention, the bicycle operating device according to the first aspect is configured so that the elastic member deforms so as to bring the adjustment member and the receiving member in contact with each other in an operated state where the operating member is in the operated position.

With the bicycle operating device according to the second aspect, the contact between the adjustment member and the receiving member effectively transmits an operation force from the operating member to the base structure in the operated state.

In accordance with a third aspect of the present invention, the bicycle operating device according to the first or second aspect further comprises a first biasing member to bias the adjustment member toward the receiving member.

With the bicycle operating device according to the third aspect, the first biasing member keeps a contact between the adjustment member and the elastic member.

In accordance with a fourth aspect of the present invention, the bicycle operating device according to the third aspect is configured so that the first biasing member includes first biasing parts to bias the adjustment member toward the receiving member.

With the bicycle operating device according to the fourth aspect, the first biasing parts effectively keep the contact between the adjustment member and the elastic member.

In accordance with a fifth aspect of the present invention, the bicycle operating device according to any one of the first to fourth aspects is configured so that the one of the base structure and the operating member includes a first threaded hole. The adjustment member includes an adjustment screw rotatably provided in the first threaded hole.

With the bicycle operating device according to the fifth aspect, rotation of the adjustment member changes a positional relationship between the base structure and the operating member.

In accordance with a sixth aspect of the present invention, the bicycle operating device according to the fifth aspect is configured so that the adjustment screw is made of a metallic material.

With the bicycle operating device according to the sixth aspect, the metallic material improves durability of the adjustment screw.

In accordance with a seventh aspect of the present invention, the bicycle operating device according to any one of the first to sixth aspects further comprises a piston. The base structure includes a base member and a transmitting member. The base member includes a cylinder bore. The piston is movably provided in the cylinder bore. The transmitting member is movably coupled to the base member to transmit the pivotal movement of the operating member to the piston. The adjustment member is attached to the transmitting member.

With the bicycle operating device according to the seventh aspect, it is possible to utilize the transmitting member as a member to which the adjustment member is attached.

In accordance with an eighth aspect of the present invention, the bicycle operating device according to the seventh aspect is configured so that the transmitting member is pivotable relative to the base member and the operating member about the pivot axis.

With the bicycle operating device according to the eighth aspect, it is possible to simplify the structure of the bicycle operating device by using the pivot axis as a common axis between the operating member and the transmitting member.

In accordance with a ninth aspect of the present invention, the bicycle operating device according to the seventh or eighth aspect further comprises a first biasing member provided between the operating member and the transmitting member to bias the adjustment member toward the receiving member.

With the bicycle operating device according to the ninth aspect, the first biasing member keeps a contact between the adjustment member and the elastic member.

In accordance with a tenth aspect of the present invention, the bicycle operating device according to the ninth aspect is configured so that the first biasing member includes first biasing parts each provided between the operating member and the transmitting member to bias the adjustment member toward the receiving member.

With the bicycle operating device according to the tenth aspect, the first biasing parts effectively keep the contact between the adjustment member and the elastic member.

In accordance with an eleventh aspect of the present invention, the bicycle operating device according to any one of the first to tenth aspects further comprises a second biasing member to bias the operating member toward the rest position.

With the bicycle operating device according to the eleventh aspect, it is possible to stabilize the operating member at the rest position when the operating member is not operated.

In accordance with a twelfth aspect of the present invention, the bicycle operating device according to the eleventh aspect further comprises a pivot shaft pivotally coupling the operating member to the base structure about the pivot axis. The second biasing member is mounted on the pivot shaft.

With the bicycle operating device according to the twelfth aspect, it is possible to simplify the structure of the bicycle operating device.

In accordance with a thirteenth aspect of the present invention, the bicycle operating device according to the eleventh or twelfth aspect further comprises a piston. The base structure includes a base member and a transmitting member. The base member includes a cylinder bore. The piston is movably provided in the cylinder bore. The transmitting member is pivotally coupled to the base member about the pivot axis to transmit the pivotal movement of the operating member to the piston. The transmitting member includes a first outer surface and a second outer surface provided on a reverse side of the first outer surface in an axial direction parallel to the pivot axis. The second biasing member is provided in an axial area defined between the first outer surface and the second outer surface in the axial direction.

With the bicycle operating device according to the thirteenth aspect, it is possible to utilize an area between the first outer surface and the second outer surface as a space in which the second biasing member is provided. This can make the bicycle operating device compact.

In accordance with a fourteenth aspect of the present invention, the bicycle operating device according to the thirteenth aspect is configured so that the transmitting member includes an axial space provided between the first outer surface and the second outer surface in the axial direction. The second biasing member is provided in the axial space.

With the bicycle operating device according to the fourteenth aspect, it is possible to utilize the axial space as a space in which the second biasing member is provided. This can make the bicycle operating device more compact.

In accordance with a fifteenth aspect of the present invention, the bicycle operating device according to the ninth or tenth aspect is configured so that the operating member includes an adapter and an operating lever. The adapter is pivotally coupled to the base member about the pivot axis. The operating lever is pivotally coupled to the adapter about an additional pivot axis. The first biasing member is provided between the adapter and the transmitting member to bias the adjustment member toward the receiving member.

With the bicycle operating device according to the fifteenth aspect, the first biasing member keeps a contact between the adjustment member and the elastic member.

In accordance with a sixteenth aspect of the present invention, the bicycle operating device according to any one of the third, ninth, tenth, and fifteenth aspects is configured so that the operating member includes an adapter and an operating lever. The adapter is pivotally coupled to the base member about the pivot axis. The operating lever is pivotally coupled to the adapter about an additional pivot axis. The adapter includes a holding space. The first biasing member is provided in the holding space.

With the bicycle operating device according to the sixteenth aspect, it is possible to effectively arrange the first biasing member in the bicycle operating device.

In accordance with a seventeenth aspect of the present invention, the bicycle operating device according to any one of the first to sixteenth aspects is configured so that the operating member includes an adapter and an operating lever. The adapter is pivotally coupled to the base member about the pivot axis. The operating lever is pivotally coupled to the adapter about an additional pivot axis. The receiving member is attached to the adapter and is a separate member from the adapter.

With the bicycle operating device according to the seventeenth aspect, it is possible to make a material of the receiving member different from a material the adapter. This improves design freedom of the bicycle operating device.

In accordance with an eighteenth aspect of the present invention, the bicycle operating device according to any one of the first to seventeenth aspects is configured so that the base structure includes a base member. The base member includes a first end portion and a second end portion. The first end portion is configured to be coupled to a bicycle handlebar in a mounting state where the bicycle operating device is mounted to the bicycle handlebar. The second end portion is opposite to the first end portion. The operating member is provided between the first end portion and the second end portion.

With the bicycle operating device according to the eighteenth aspect, it is possible to utilize an area between the first end portion and the second end portion as a space in which the operating member is provided.

In accordance with a nineteenth aspect of the present invention, the bicycle operating device according to the eighteenth aspect is configured so that the first end portion includes a mounting surface having a curved shape corresponding to a drop-down handlebar.

With the bicycle operating device according to the nineteenth aspect, the elastic member reduces noise caused by an intermittent contact between the adjustment member and the receiving member under vibration of the bicycle operating device in a case where the bicycle operating device is a road-bike operating device.

In accordance with a twentieth aspect of the present invention, the bicycle operating device according to the eighteenth or nineteenth aspect is configured so that the base member includes a grip portion arranged between the first end portion and the second end portion.

With the bicycle operating device according to the twentieth aspect, the elastic member reduces noise caused by an intermittent contact between the adjustment member and the receiving member under vibration of the bicycle operating device in a case where the bicycle operating device is a road-bike operating device.

In accordance with a twenty-first aspect of the present invention, the bicycle operating device according to any one of the eighteenth to twentieth aspects is configured so that the second end portion includes a pommel portion.

With the bicycle operating device according to the twenty-first aspect, the elastic member reduces noise caused by an intermittent contact between the adjustment member and the receiving member under vibration of the bicycle operating device in a case where the bicycle operating device is a road-bike operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
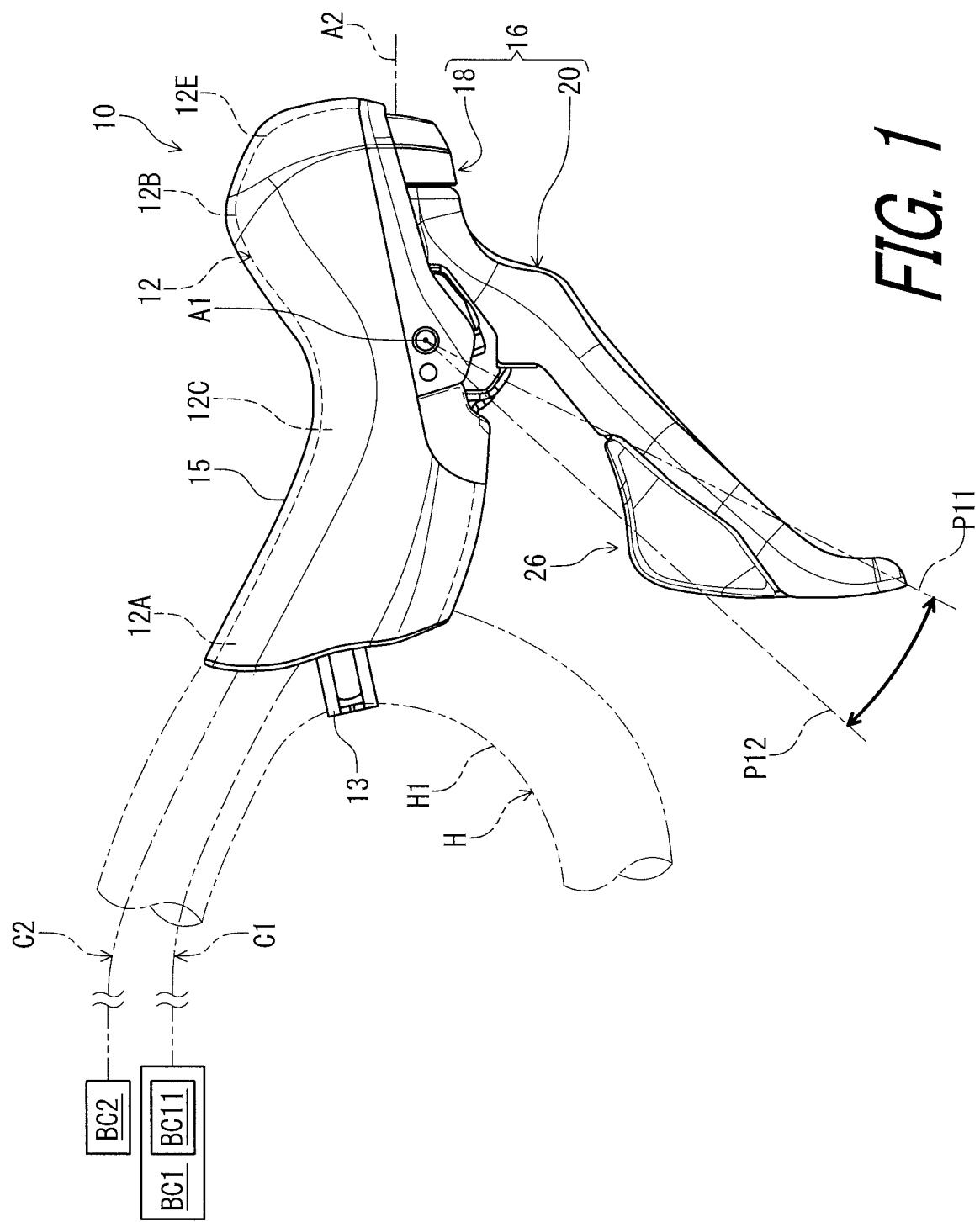
FIG. 1 is a right side elevational view of a bicycle operating device in accordance with an embodiment.

The embodiment(s) will now be described with reference to the accompanying drawings, wherein like reference numerals designate corresponding or identical elements throughout the various drawings.

Referring initially to FIG. 1, a bicycle operating device 10 in accordance with an embodiment is configured to be mounted to a bicycle handlebar H. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The bicycle handlebar H can also be referred to as the drop-down handlebar H. Furthermore, the bicycle operating device 10 can be mounted to parts other than the bicycle handlebar H in the bicycle. Since structures of the bicycle have been known in the bicycle field, they will not be described in detail here for the sake of brevity.

The bicycle operating device 10 is operatively coupled to a bicycle component BC1. In this embodiment, the bicycle operating device 10 is operatively coupled to the bicycle component BC1 with a control cable C1. Examples of the bicycle component BC1 include a shift device, an adjustable seatpost assembly, and a bicycle suspension. Examples of the control cable C1 include a Bowden cable. In this embodiment, the bicycle component BC1 includes a shift device BC11 configured to change a gear position.

Furthermore, the bicycle operating device 10 is operatively coupled to an additional bicycle component BC2 such as a hydraulic bicycle brake. In this embodiment, the bicycle operating device 10 is operatively coupled to the additional bicycle component BC2 with a hydraulic hose C2. However, the additional bicycle component BC2 can be a bicycle component other than the hydraulic bicycle brake. The additional bicycle component BC2 can be omitted from the bicycle operating device 10.

In this embodiment, the bicycle operating device 10 is a right-hand side control device configured to be operated by the rider's right hand to actuate the additional bicycle component BC2 and the bicycle component BC1. However, the structures of the bicycle operating device 10 can be applied to a left-hand side control device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device comprises a base structure 11. The base structure 11 includes a base member 12. The base member 12 is configured to be mounted to the bicycle handlebar H. However, the base member 12 can be mounted to parts other than the bicycle handlebar H in a bicycle. The base member 12 includes a first end portion 12A, a second end portion 12B, and a grip portion 12C. The first end portion 12A is configured to be coupled to the bicycle handlebar H in a mounting state where the bicycle operating device 10 is mounted to the bicycle handlebar H. The second end portion 12B is opposite to the first end portion 12A. The grip portion 12C is arranged between the first end portion 12A and the second end portion 12B.

The drop-down handlebar H includes a curved part H1. The second end portion 12B is configured to be coupled to the curved part H1 in a mounting state where the bicycle operating device 10 is mounted to the bicycle handlebar H. The bicycle operating device 10 comprises a mounting clamp 13 to couple the base member 12 to the bicycle handlebar H.

Figure 2:
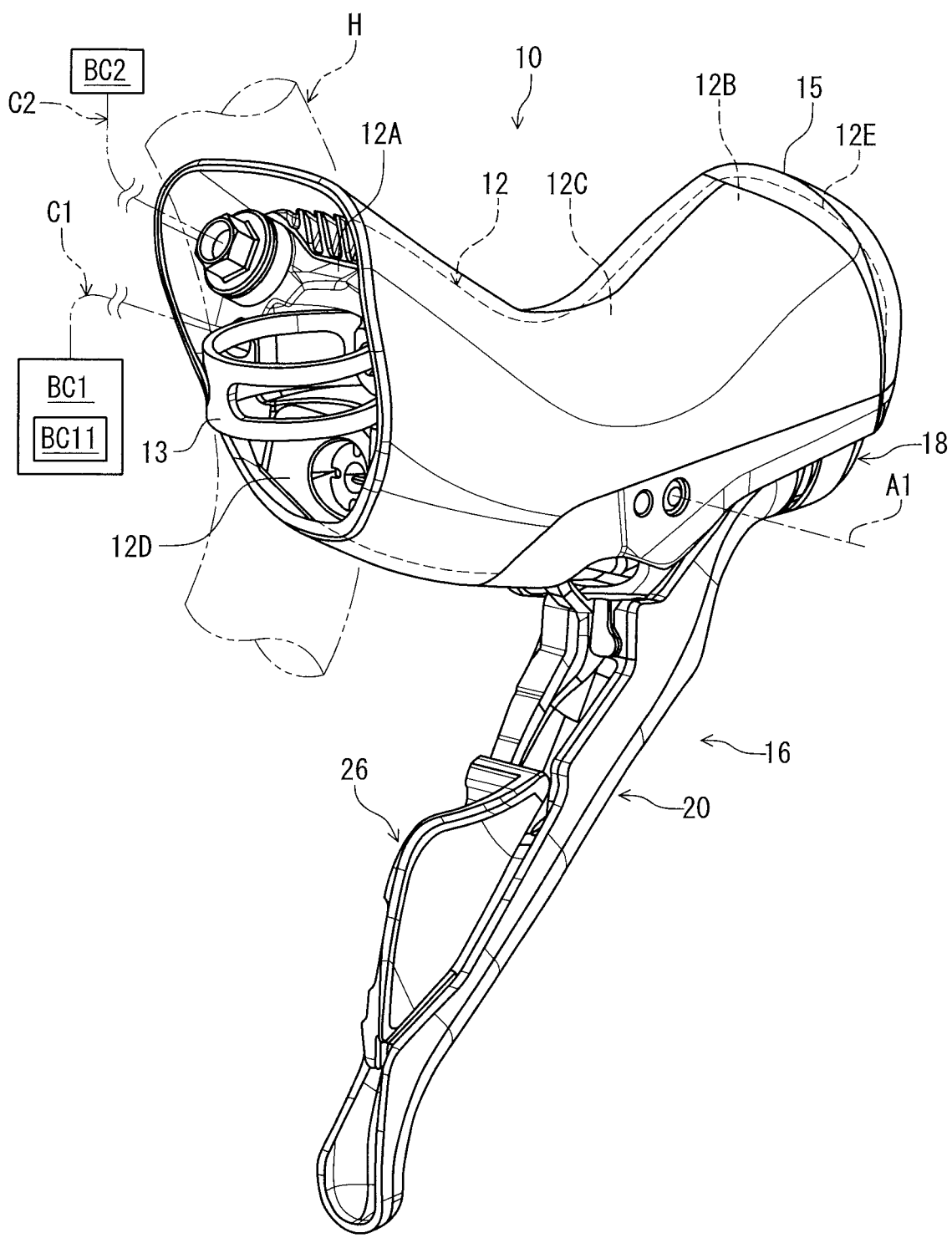
FIG. 2 is a perspective view of the bicycle operating device illustrated in FIG. 1.

As seen in FIG. 2, the first end portion 12A includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the second end portion 12B includes a pommel portion 12E. The pommel portion 12E extends obliquely upward from the grip portion 12C. The pommel portion 12E is disposed above the second end portion 12B in the mounting state of the bicycle operating device 10. The pommel portion 12E can also be configured to be graspable if needed and/or desired.

In this embodiment, the bicycle operating device 10 further comprises a grip cover 15 attached to the base member 12 to at least partly cover the base member 12. The grip cover 15 is at least partly made of an elastic material such as rubber.

As seen in FIG. 1, the bicycle operating device 10 comprises an operating member 16 pivotally coupled to the base structure 11 about a pivot axis A1. The operating member 16 is pivotally coupled to the base member 12 about a pivot axis A1. The operating member 16 is provided between the first end portion 12A and the second end portion 12B. The operating member 16 extends downward from the base member 12 in the mounting state of the bicycle operating device 10. The operating member 16 is pivotable relative to the base structure 11 about the pivot axis A1 between a rest position P11 and an operated position P12. The operating member 16 is pivotable relative to the base member 12 between the rest position P11 and the operated position P12. In this embodiment, the operating member 16 is provided as a brake operating lever pivotable about the pivot axis A1. However, the operating member 16 is not limited to the brake operating lever.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
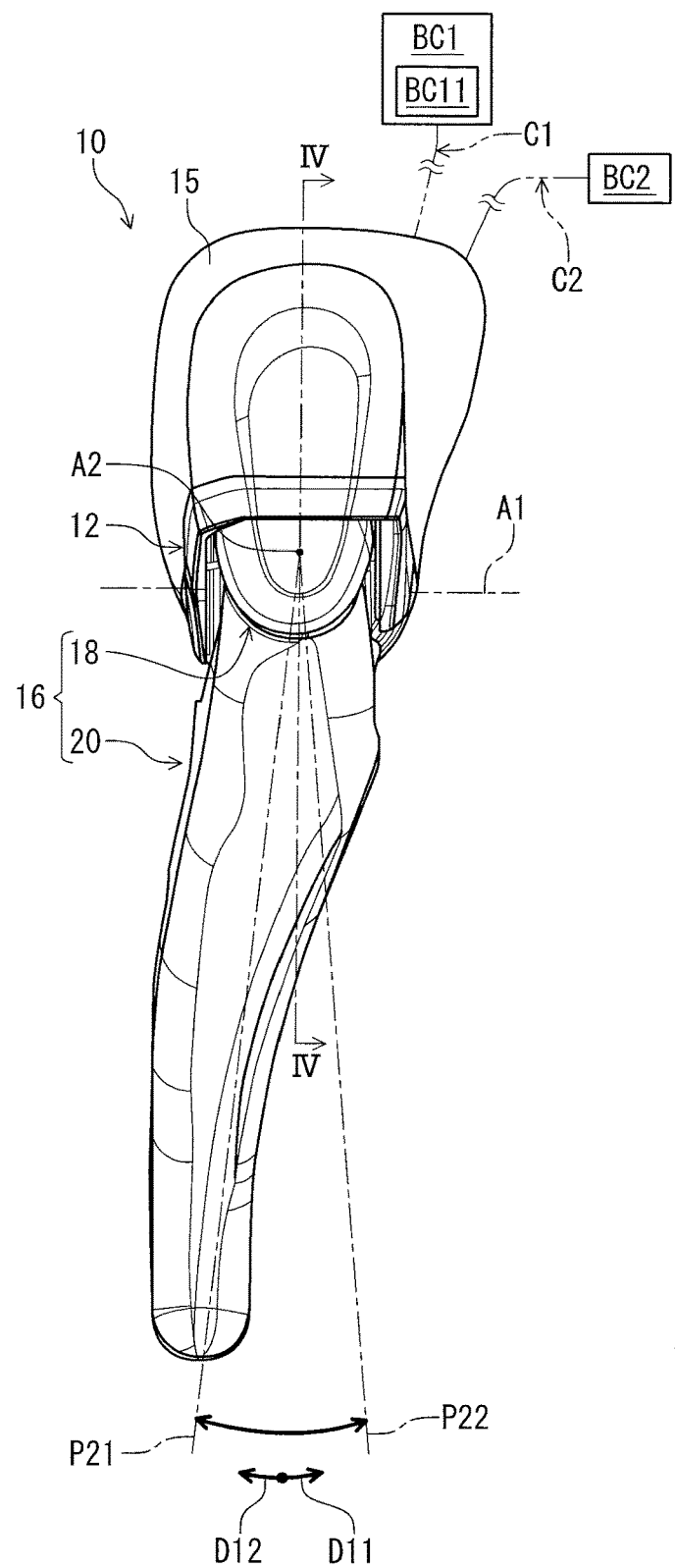
FIG. 3 is a front view of the bicycle operating device illustrated in FIG. 1.

As seen in FIG. 3, the operating member 16 is pivotable relative to the base member 12 about the additional pivot axis A2. The operating member 16 is pivotable relative to the base member 12 between a first rest position P21 and a first operated position P22. The operating member 16 is pivoted relative to the base member 12 from the first rest position P21 to the first operated position P22 in a first operating direction D11. The operating member 16 is pivoted relative to the base member 12 from the first operated position P22 toward the first rest position P21 in a first release direction D12 opposite to the first operating direction D11. The first operating direction D11 and the first release direction D12 are defined along a circumferential direction defined about the additional pivot axis A2. In this embodiment, the operating member 16 is provided as a shift lever pivotable about the additional pivot axis A2. However, the operating member 16 is not limited to the shift lever.

As seen in FIGS. 1 and 3, the operating member 16 includes an adapter 18 and an operating lever 20. The adapter 18 is pivotally coupled to the base member 12 about the pivot axis A1. The operating lever 20 is pivotally coupled to the adapter 18 about an additional pivot axis A2. Namely, the operating lever 20 is pivotally coupled to the base member 12 about each of the pivot axis A1 and the additional pivot axis A2. In this embodiment, the additional pivot axis A2 is non-parallel to the pivot axis A1.

Figure 4:
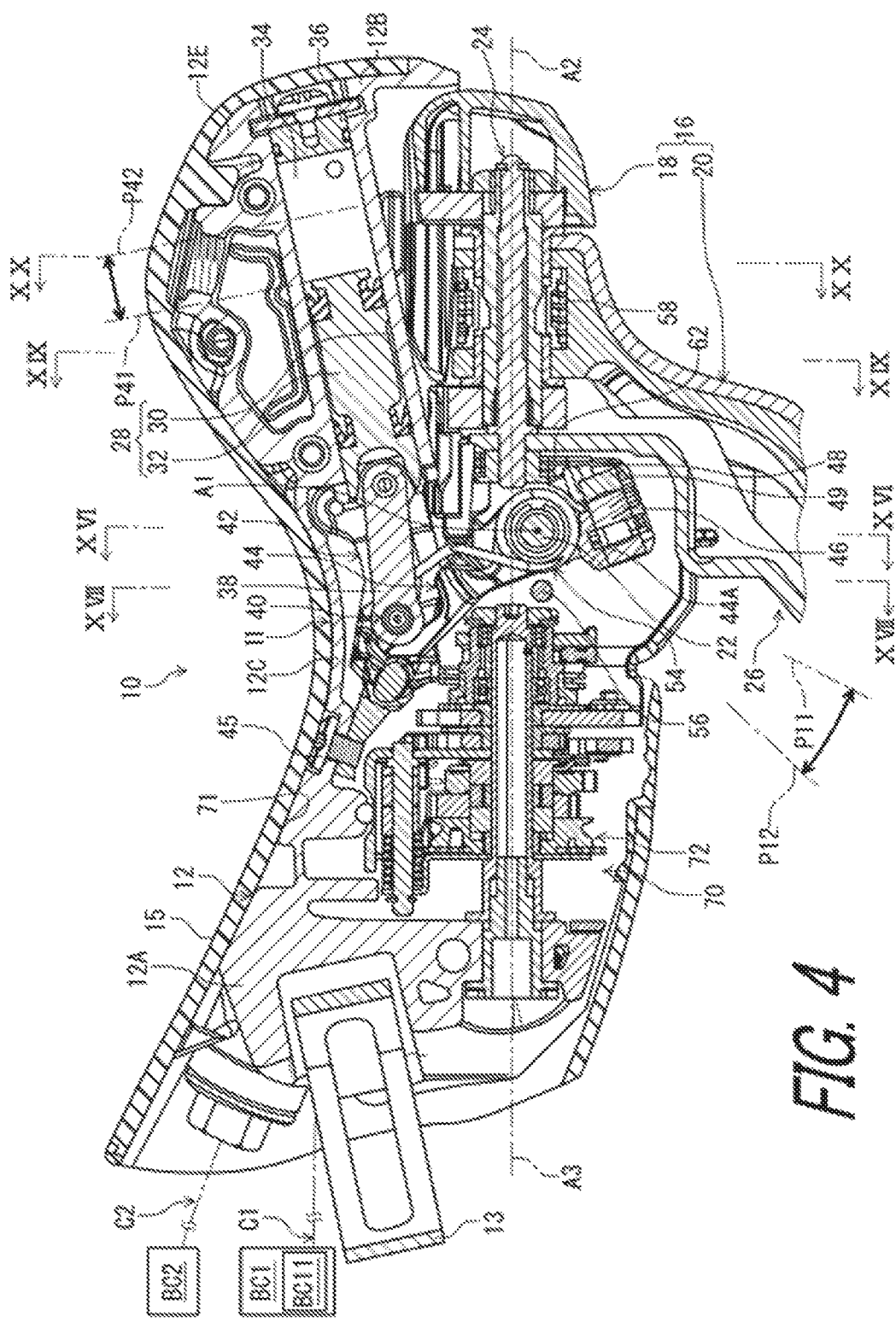
FIG. 4 is a partial cross-sectional view of the bicycle operating device taken along line IV-IV of FIG. 3.

As seen in FIG. 4, the bicycle operating device 10 comprises a pivot shaft 22 and an operating shaft 24. The pivot shaft 22 pivotally couples the operating member 16 to the base structure 11 about the pivot axis A1. The pivot shaft 22 pivotally couples the adapter 18 to the base member 12 about the pivot axis A1. The pivot shaft 22 defines the pivot axis A1. The operating shaft 24 pivotally couples the operating lever 20 to the adapter 18 about the additional pivot axis A2. The operating shaft 24 defines the additional pivot axis A2.

Figure 5:
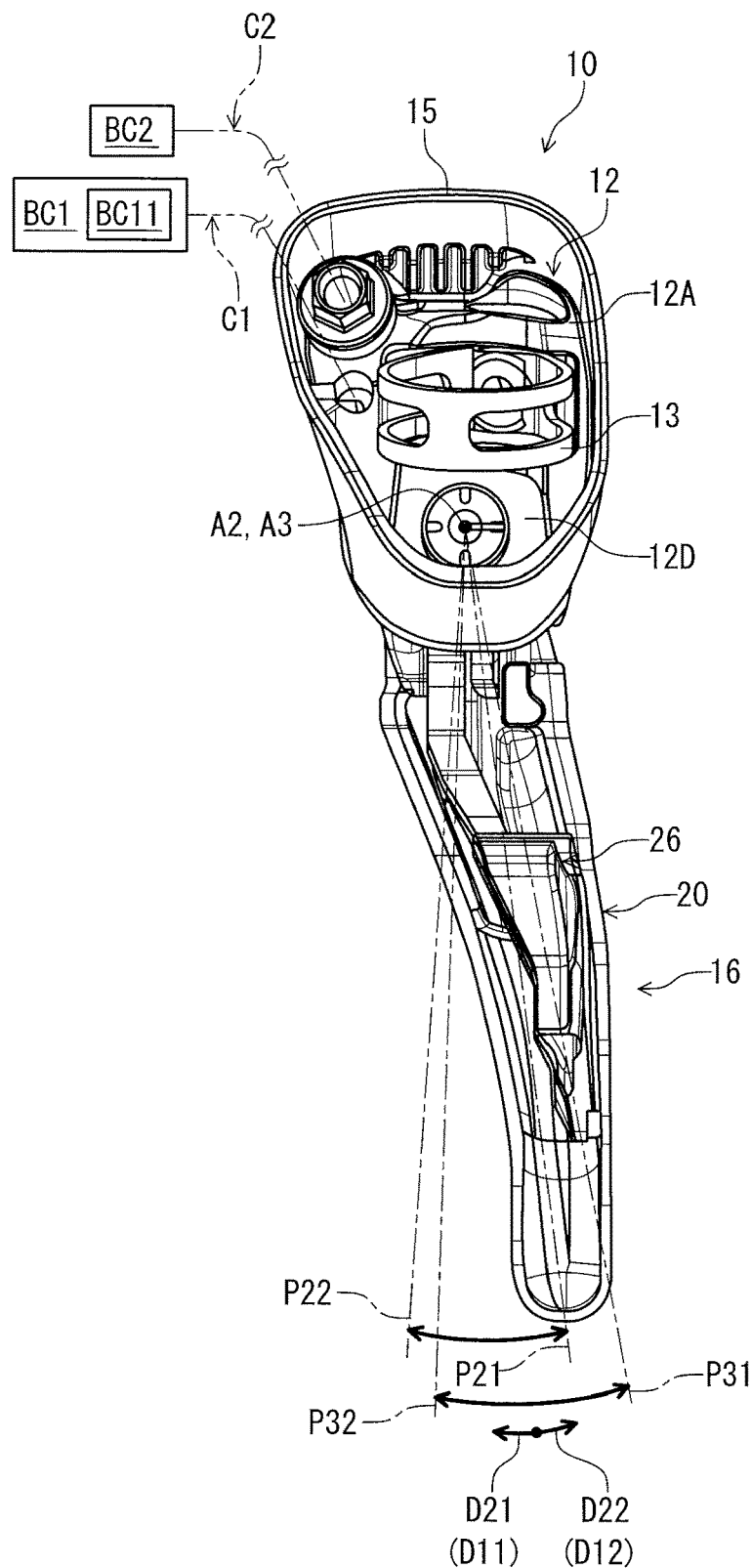
FIG. 5 is a rear view of the bicycle operating device illustrated in FIG. 1.

As seen in FIG. 5, the bicycle operating device 10 further comprises an additional operating member 26. The additional operating member 26 is pivotally provided on one of the operating member 16 and the base member 12 about the additional pivot axis A2. In this embodiment, the additional operating member 26 is pivotally provided on the operating member 16. Specifically, the additional operating member 26 is pivotally coupled to the adapter 18 about the additional pivot axis A2. The operating shaft 24 pivotally couples the additional operating member 26 to the adapter 18 about the additional pivot axis A2.

The additional operating member 26 is pivotable relative to the base member 12 between a second rest position P31 and a second operated position P32. The additional operating member 26 is pivoted relative to the base member 12 from the second rest position P31 to the second operated position P32 in a second operating direction D21. The additional operating member 26 is pivoted relative to the base member 12 from the second operated position P32 toward the second rest position P31 in a second release direction D22 opposite to the second operating direction D21.

The second operating direction D21 and the second release direction D22 are defined along the circumferential direction defined about the additional pivot axis A2. The second operating direction D21 coincides with the first operating direction D11. The second release direction D22 coincides with the first release direction D12. However, the second operating direction D21 can be different from the first operating direction D11. The second release direction D22 can be different from the first release direction D12. In this embodiment, the additional operating member 26 is provided as an additional shift lever pivotable about the additional pivot axis A2. However, the additional operating member 26 is not limited to the additional shift lever. The additional operating member 26 can be omitted from the bicycle operating device 10.

As seen in FIG. 4, the bicycle operating device 10 comprises a hydraulic unit 28 provided on the base member 12. The hydraulic unit 28 includes a cylinder bore 30 and a piston 32 movably provided in the cylinder bore 30. In this embodiment, the base member 12 includes a cylinder bore 30. The cylinder bore 30 and the piston 32 define a hydraulic chamber 34. The hydraulic unit 28 includes a closing member 36 attached to the base member 12 to close an end of the cylinder bore 30. The cylinder bore 30, the piston 32, and the closing member 36 define the hydraulic chamber 34. The hydraulic chamber 34 is connected to the additional bicycle component BC2 with a fluid passageway (not shown) and the hydraulic hose C2 to supply a hydraulic pressure to the additional bicycle component BC2.

The piston 32 is movable relative to the cylinder bore 30 in response to a pivotal movement of the operating member 16. Specifically, the piston 32 is movable relative to the cylinder bore 30 between an initial position P41 and an actuated position P42. The initial position P41 corresponds to the rest position P11 of the operating member 16. The actuated position P42 corresponds to the operated position P12 of the operating member 16. Specifically, the piston 32 is at the initial position P41 in the rest state where the operating member 16 is at the rest position P11 (FIG. 1). The piston 32 is at the actuated position P42 in an operated state where the operating member 16 is at the operated position P12 (FIG. 1). The piston 32 is configured to be pushed from the initial position P41 to the actuated position P42 in response to the pivotal movement of the operating member 16 from the rest position P11 toward the operated position P12 to supply the hydraulic pressure to the additional bicycle component BC2.

Figure 6:
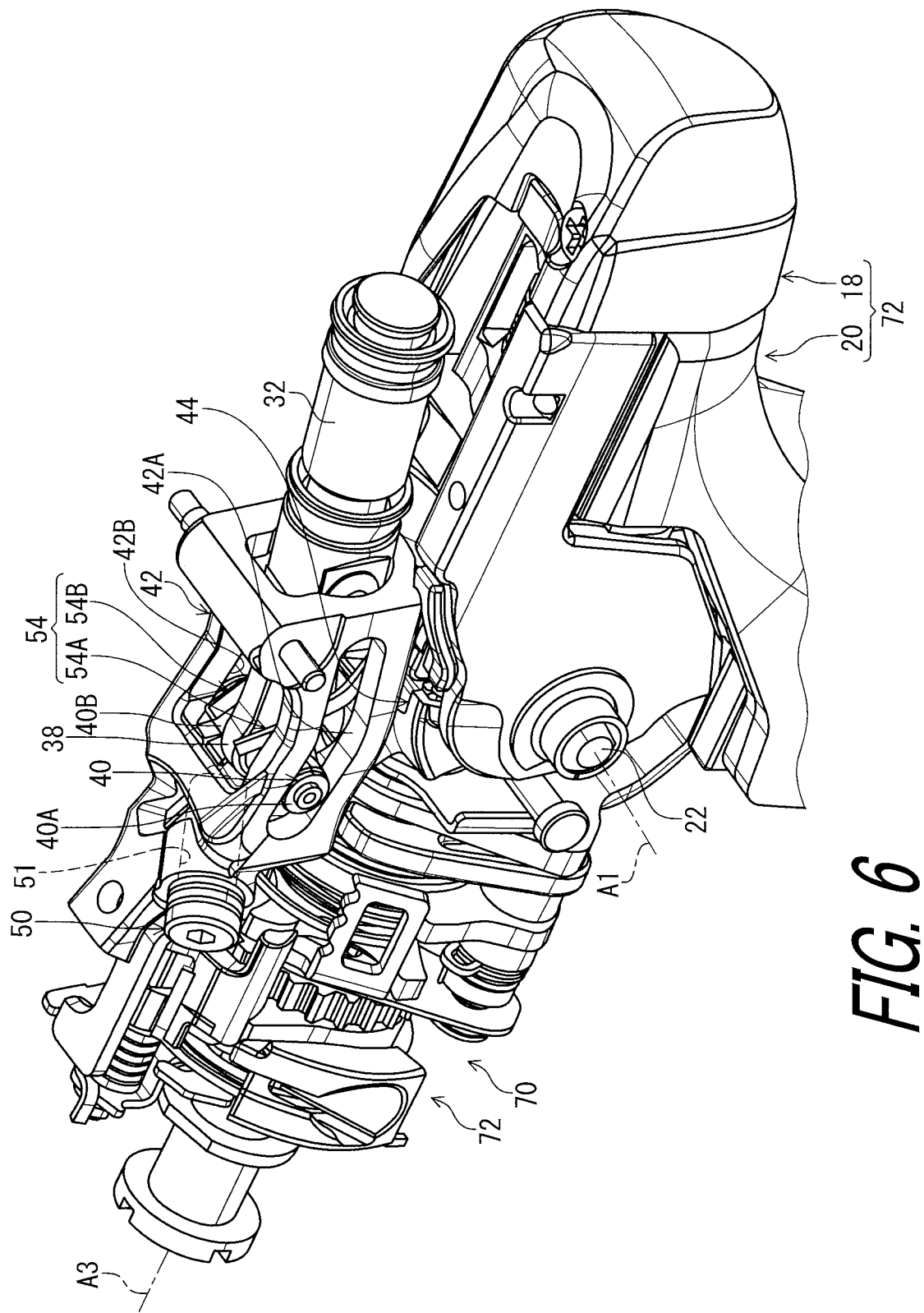
FIG. 6 is a perspective view of an internal structure of the bicycle operating device illustrated in FIG. 1.
Figure 7:
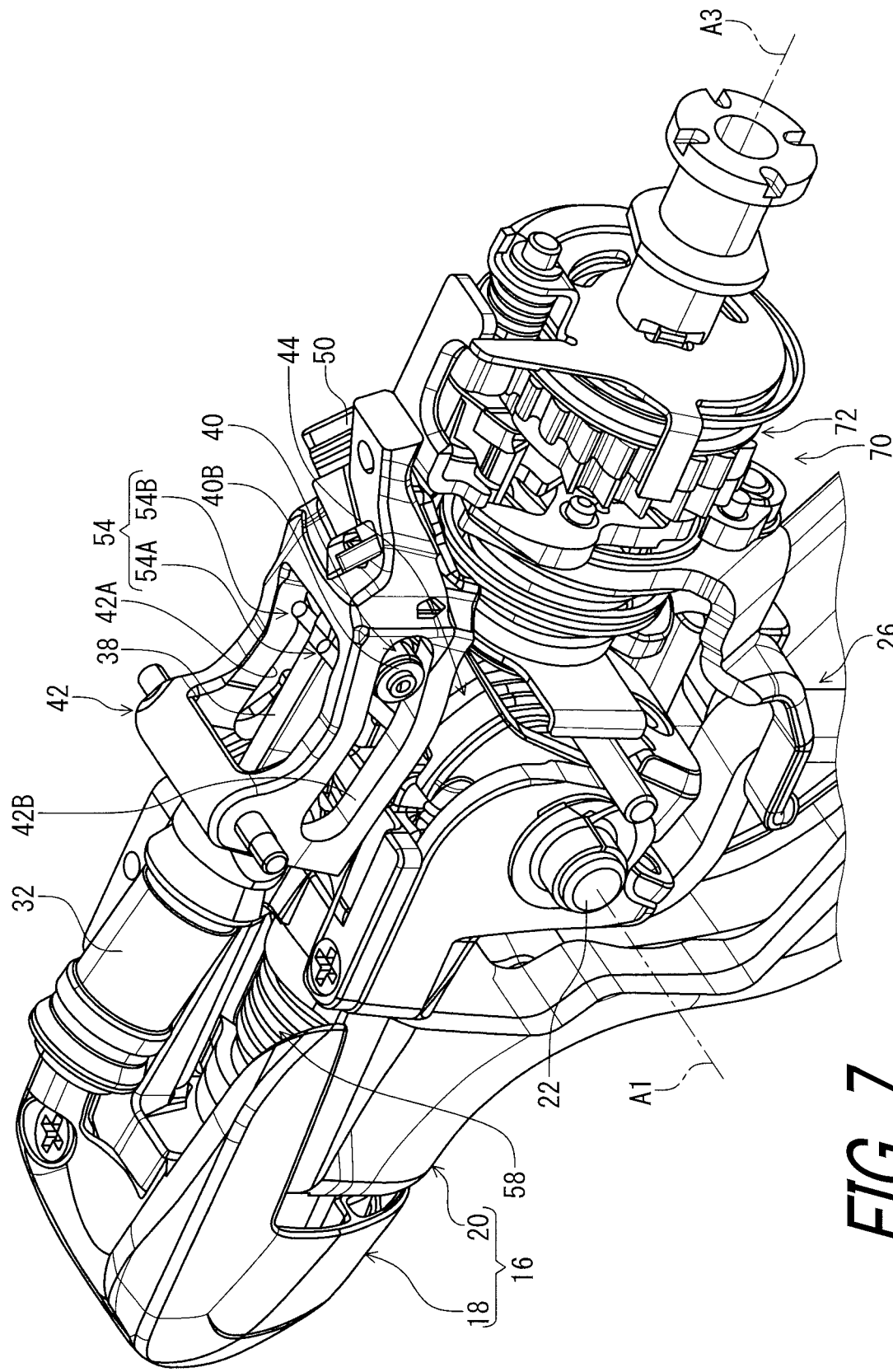
FIG. 7 is another perspective view of the internal structure of the bicycle operating device illustrated in FIG. 1.

As seen in FIGS. 4, 6, and 7, the bicycle operating device 10 comprises a piston rod 38, a guide pin 40, and a guide member 42. The base structure 11 includes a transmitting member 44. The piston rod 38 operatively couples the piston 32 to the guide pin 40. As seen in FIG. 4, the guide member 42 is detachably attached to the base member 12 with a screw 45. As seen in FIGS. 6 and 7, the guide member 42 includes a pair of guide grooves 42A and 42B. Ends 40A and 40B of the guide pin 40 are movably provided in the guide grooves 42A and 42B, respectively.

Figure 8:
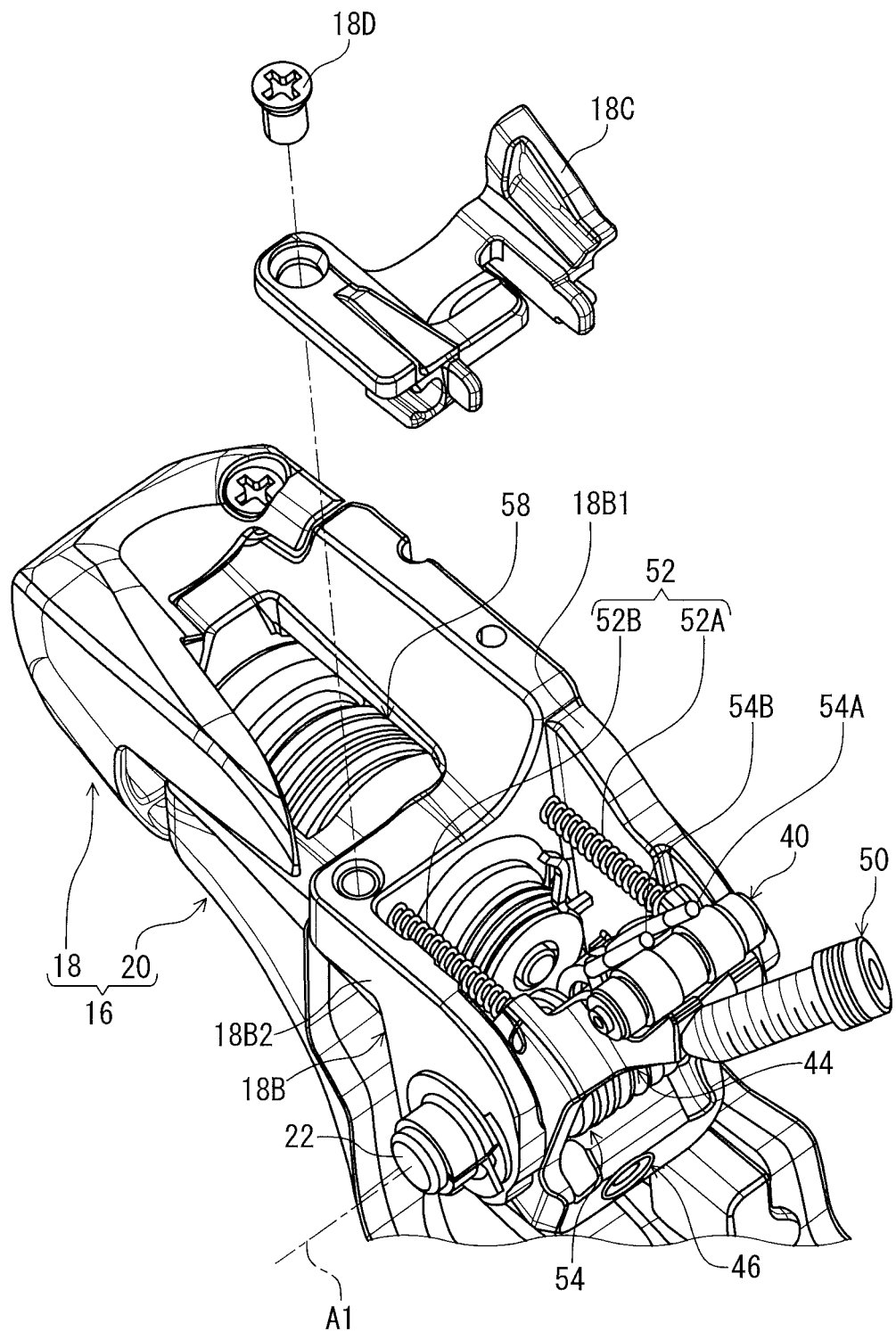
FIG. 8 is an exploded perspective view of an operating member and a surrounding structure of the operating member of the bicycle operating device illustrated in FIG. 1.

As seen in FIG. 8, the transmitting member 44 is movably coupled to the base member 12 to transmit the pivotal movement of the operating member 16 to the piston 32. The transmitting member 44 is pivotable relative to the base member 12 and the operating member 16 about the pivot axis A1. The transmitting member 44 is pivotally coupled to the base member 12 with the pivot shaft 22. The transmitting member 44 is in contact with the guide pin 40. The transmitting member 44 is pivotally coupled to the base member 12 about the pivot axis A1 to transmit the pivotal movement of the operating member 16 to the piston 32. Specifically, the transmitting member 44 is pivotable relative to the base member 12 about the pivot axis A1 to transmit the pivotal movement of the operating member 16 to the guide pin 40.

As seen in FIG. 4, the bicycle operating device 10 comprises an adjustment member 46 and a receiving member 48. The adjustment member 46 is attached to one of the base structure 11 and the operating member 16 to change the rest position P11 of the operating member 16 relative to the base structure 11. The receiving member 48 is provided to the other of the operating member 16 and the base structure 11 to be movable with the adjustment member 46 in response to a pivotal movement of the operating member 16 relative to the base structure 11. In this embodiment, the adjustment member 46 is attached to the base structure 11 to change the rest position P11 of the operating member 16 relative to the base structure 11. The adjustment member 46 is attached to the transmitting member 44. The receiving member 48 is provided to the operating member 16 to be movable with the adjustment member 46 in response to the pivotal movement of the operating member 16 relative to the base structure 11. However, the adjustment member 46 can be attached to the operating member 16, and the receiving member 48 can be provided to the base structure 11.

Figure 9:
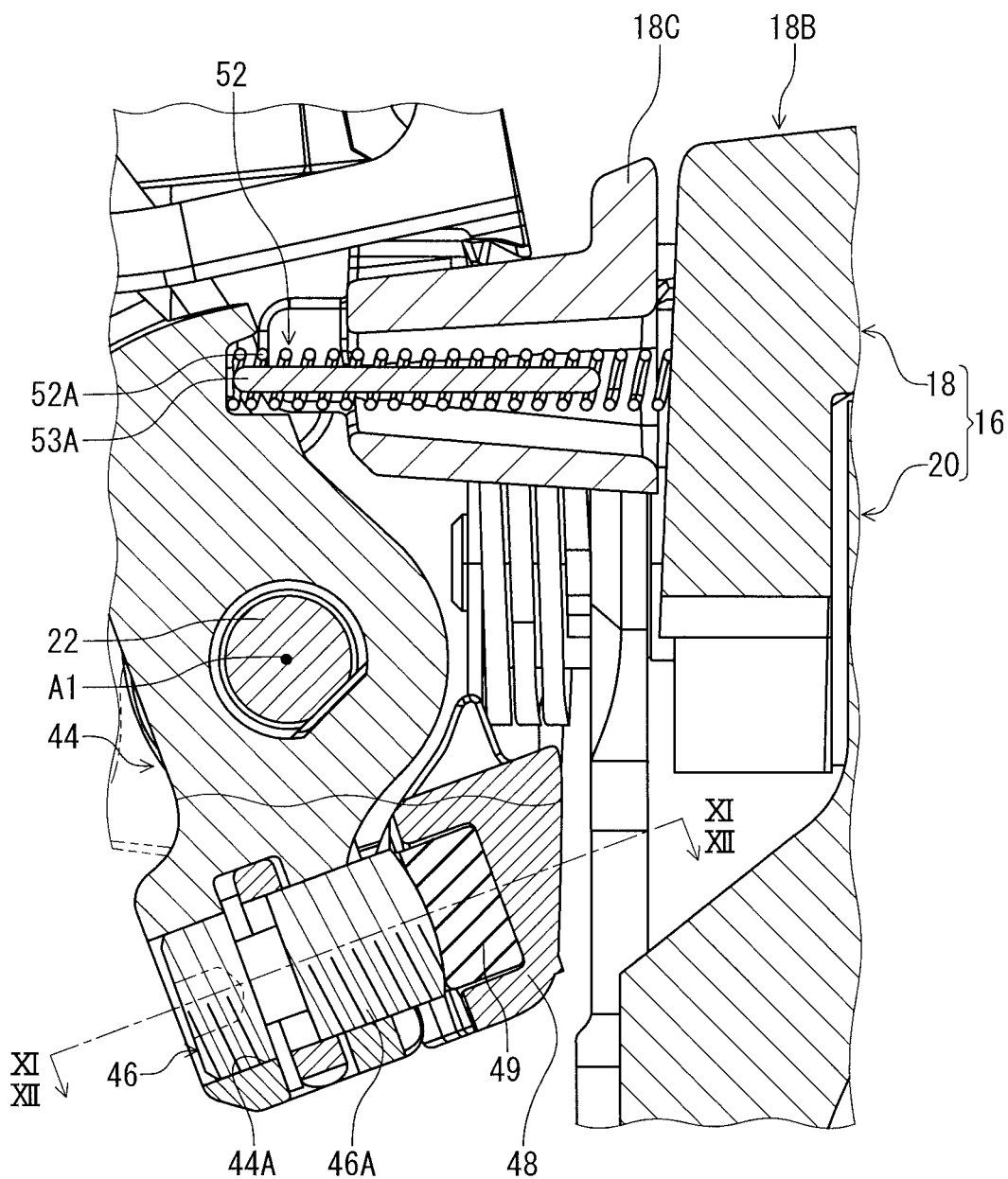
FIG. 9 is a cross-sectional view of the operating member and the surrounding structure illustrated in FIG. 8.

As seen in FIG. 9, for example, the one of the base structure 11 and the operating member 16 includes a first threaded hole. In this embodiment, the base structure 11 includes a first threaded hole 44A. The transmitting member 44 includes the first threaded hole 44A. The adjustment member 46 includes an adjustment screw 46A rotatably provided in the first threaded hole 44A. The adjustment member 46 is threadedly engaged with the first threaded hole 44A. An end of the adjustment member 46 is in contact with the receiving member 48.

The bicycle operating device 10 comprises an elastic member 49. The elastic member 49 is provided between the adjustment member 46 and the receiving member 48 to keep a clearance between the adjustment member 46 and an entirety of the receiving member 48 in a rest state where the operating member 16 is in the rest position P11. The elastic member 49 deforms so as to bring the adjustment member 46 and the receiving member 48 in contact with each other in an operated state where the operating member 16 is in the operated position P12.

Figure 10:
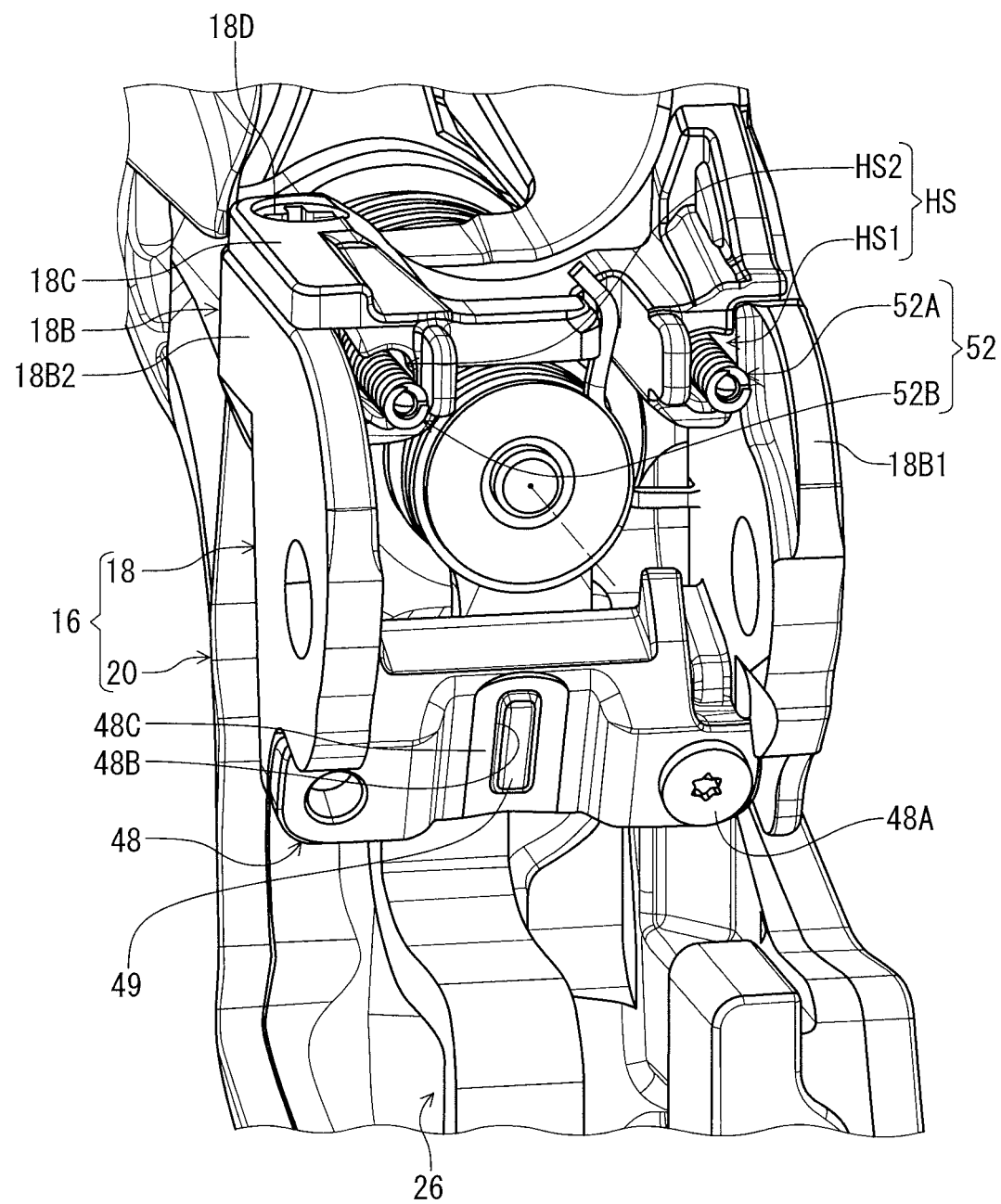
FIG. 10 is a perspective view of the operating member and a surrounding structure of the operating member of the bicycle operating device illustrated in FIG. 1.

As seen in FIG. 10, the receiving member 48 is attached to the adapter 18 and is a separate member from the adapter 18. The receiving member 48 is secured to the adapter 18 with a screw 48A. The elastic member 49 is attached to the receiving member 48 and is a separate member from the receiving member 48. The elastic member 49 is made of a material different from a material of the adjustment member 46 and a material of the receiving member 48. The adjustment screw 46A is made of a metallic material. The receiving member 48 is made of a rigid member such as a metallic material. The elastic member 49 is made of an elastic material such as rubber.

Figure 11:
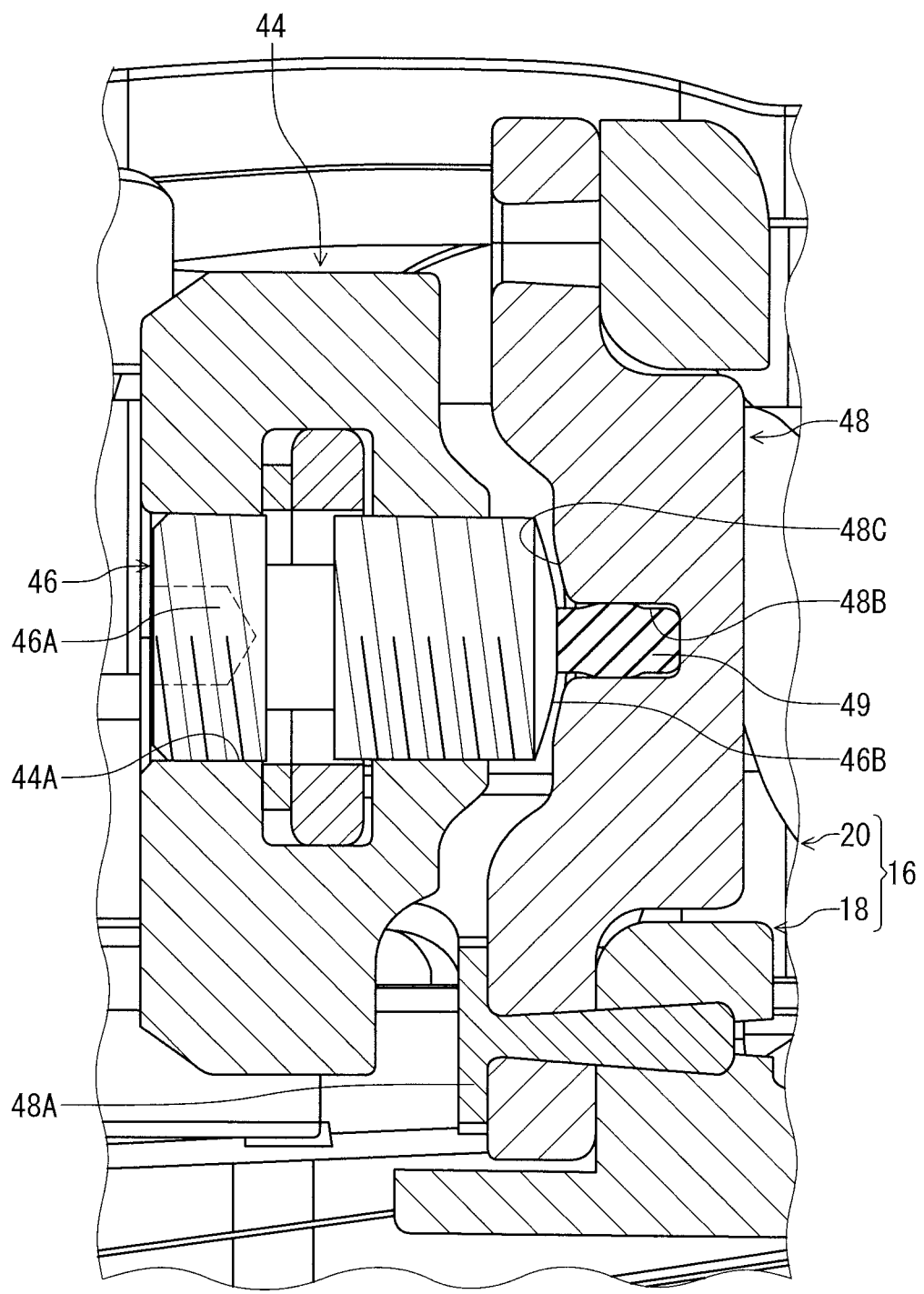
FIG. 11 is a cross-sectional view of the operating member and the surrounding structure taken along line XI-XI of FIG. 9 (rest state).

As seen in FIG. 11, the receiving member 48 includes a groove 48B. The elastic member 49 is provided in the groove 48B. The receiving member 48 includes a contact surface 48C having a curved shape. The adjustment member 46 includes a curved surface 46B contactable with the contact surface 48C of the receiving member 48. As seen in FIG. 10, the contact surface 48C is provided about the groove 48B and the elastic member 49.

Figure 12:
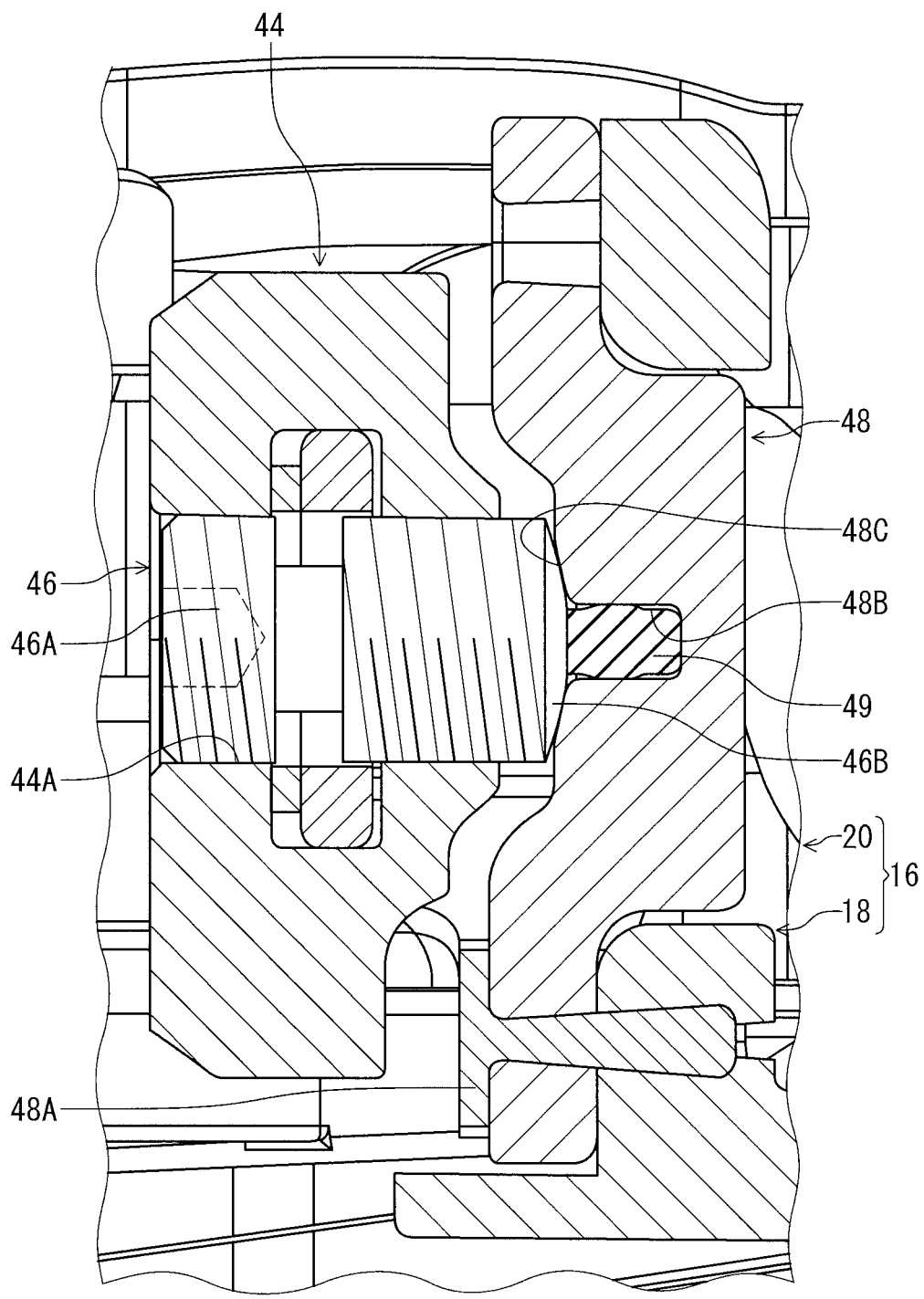
FIG. 12 is a cross-sectional view of the operating member and the surrounding structure taken along line XII-XII of FIG. 9 (operated state).

As seen in FIG. 11, the curved surface 46B is in contact with the elastic member 49 but spaced apart from the contact surface 48C in the rest state. As seen in FIG. 12, the curved surface 46B is in contact with the contact surface 48C and the elastic member 49 in the operated state. Operation force is transmitted from the operating member 16 to the transmitting member 44 through the receiving member 48 and the adjustment member 46 when the operating member 16 is pivoted from the rest position P11 toward the operated position P12.

Figure 13:
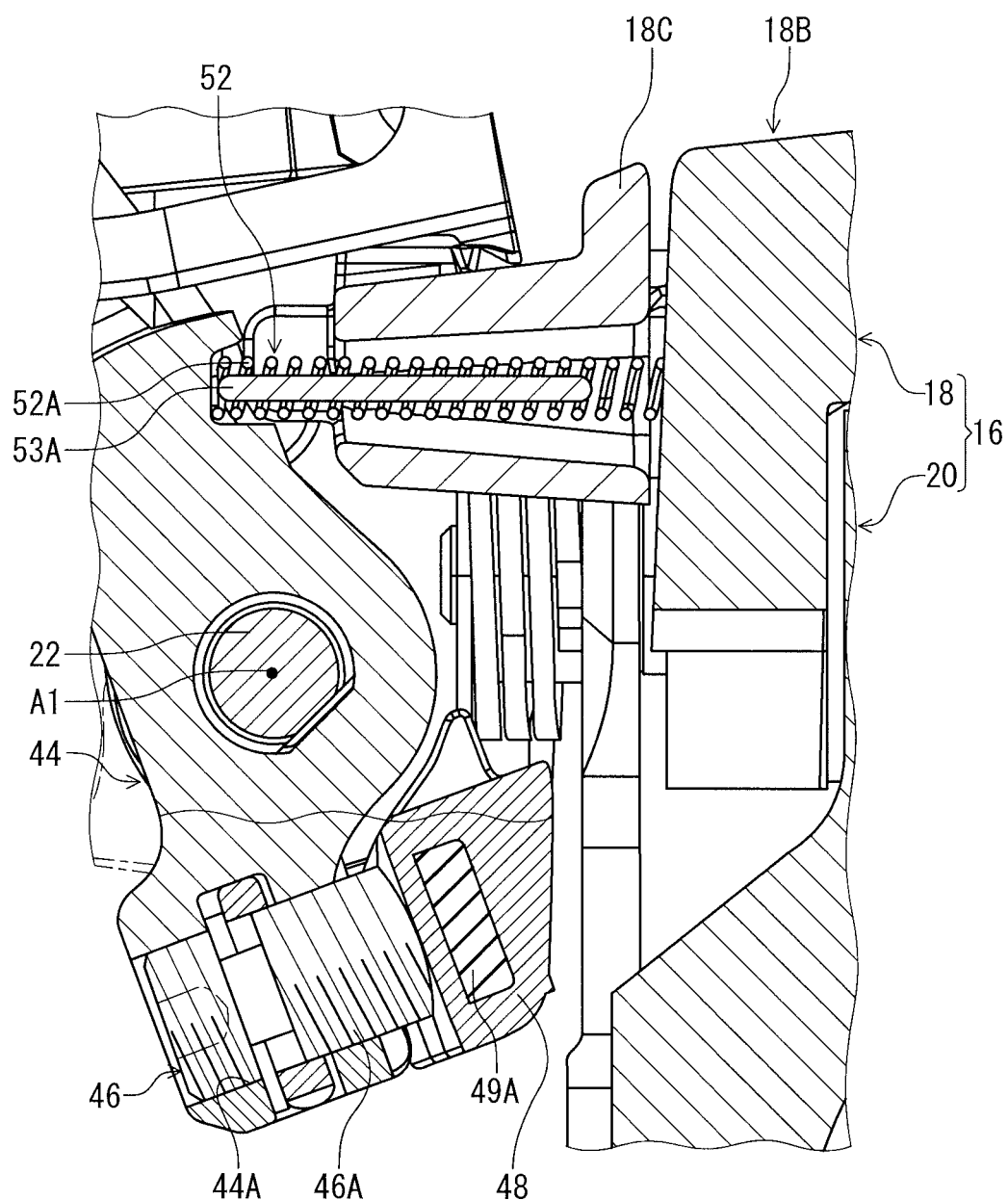
FIG. 13 is a cross-sectional view of the operating member and the surrounding structure of the bicycle operating device in accordance with a modification.

As seen in FIG. 13, a magnet 49A can be provided to the receiving member 48 instead of the elastic member 49. The magnet 49A is provided in the receiving member 48. The adjustment member 46 is attracted by the magnet 49A to be in contact with the receiving member 48.

As seen in FIG. 6, the bicycle operating device 10 comprises an additional adjustment member 50 to change the initial position P41 (FIG. 4) of the piston 32 relative to the base member 12. In this embodiment, the additional adjustment member 50 includes an adjustment screw mounted to the guide member 42. The additional adjustment member 50 is threadedly engaged with a second threaded hole 51 (FIG. 6) of the guide member 42. As seen in FIG. 8, an end of the additional adjustment member 50 is in contact with the transmitting member 44.

As seen in FIGS. 8 and 9, the bicycle operating device 10 further comprises a first biasing member 52 to bias the adjustment member 46 toward the receiving member 48. The first biasing member 52 is provided between the operating member 16 and the transmitting member 44 to bias the adjustment member 46 toward the receiving member 48. In this embodiment, as seen in FIG. 8, the first biasing member 52 includes first biasing parts 52A and 52B to bias the adjustment member 46 toward the receiving member 48. The first biasing parts 52A and 52B are each provided between the operating member 16 and the transmitting member 44 to bias the adjustment member 46 toward the receiving member 48. For example, each of the first biasing parts 52A and 52B include a coiled spring. As seen in FIG. 9, the first biasing member 52 is provided on an opposite side of the adjustment member 46 and the receiving member 48 relative to the pivot axis A1 as viewed along the pivot axis A1. The first biasing member 52 is provided on an opposite side of the adjustment member 46 and the receiving member 48 relative to the pivot axis A1 as viewed along the pivot axis A1.

As seen in FIG. 10, the adapter 18 includes a holding space HS. The first biasing member 52 is provided in the holding space HS. In this embodiment, the holding space HS includes holding openings HS1 and HS2. The first biasing parts 52A and 52B are respectively provided in the holding openings HS1 and HS2.

As seen in FIG. 8, the adapter 18 includes an adapter body 18B and a holding part 18C. The adapter body 18B is pivotally coupled to the base member 12 about the pivot axis A1 with the pivot shaft 22. The holding part 18C is attached to the adapter body 18B to hold the first biasing member 52. The holding part 18C is secured to the adapter body 18B with a screw 18D.

As seen in FIG. 10, the adapter body 18B includes a first wall 18B1 and a second wall 18B2. The first wall 18B1 and the second wall 18B2 are pivotally coupled to the base member 12 about the pivot axis A1. The second wall 18B2 is spaced apart from the first wall 18B1. The first biasing member 52 is provided between the first wall 18B1 and the second wall 18B2.

Figure 14:
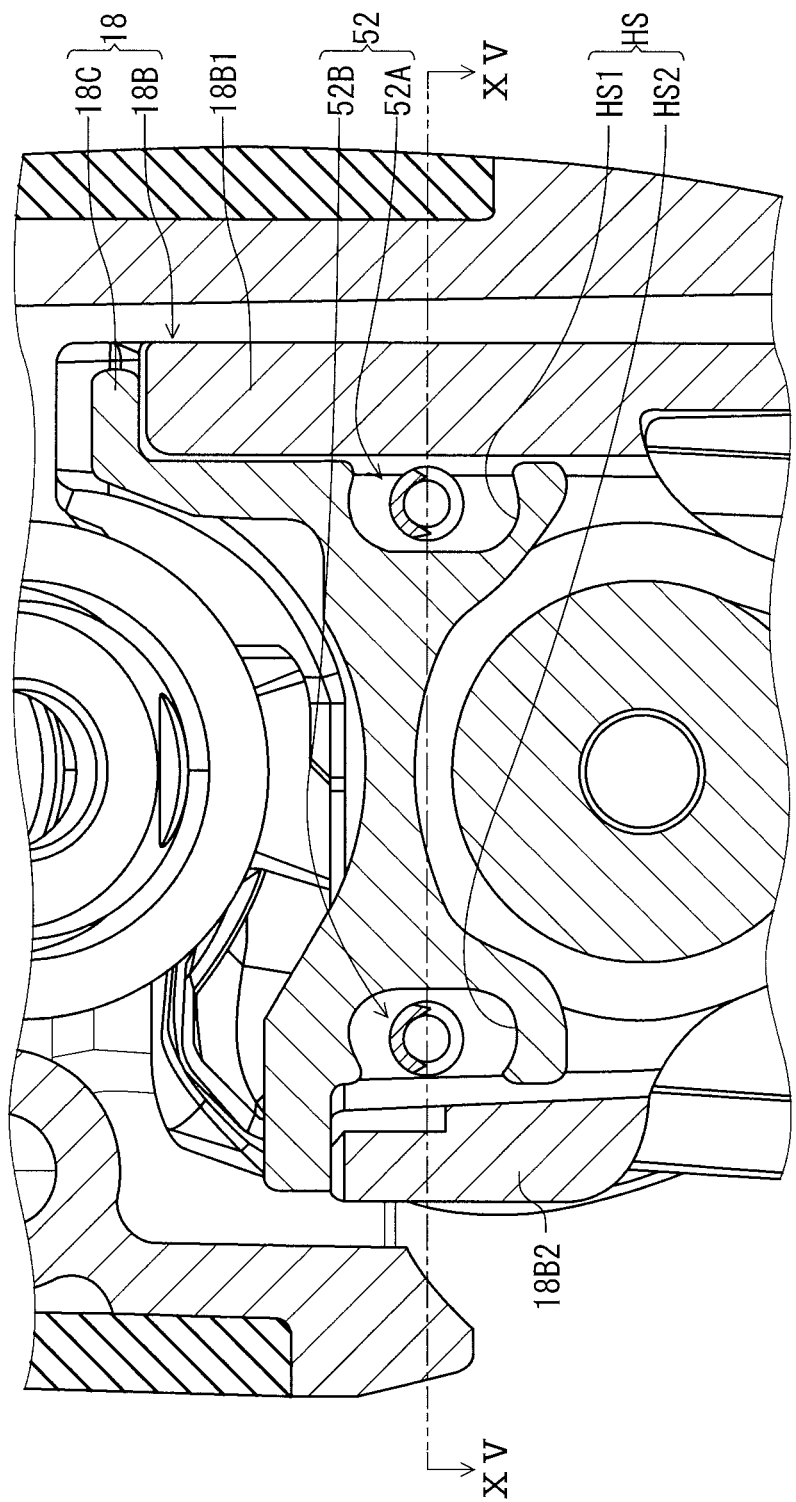
FIG. 14 is a cross-sectional view of the bicycle operating device taken along line XIV-XIV of FIG. 4.

As seen in FIG. 14, the holding part 18C includes the holding openings HS1 and HS2. The first biasing part 52A is provided between the holding part 18C and the first wall 18B1 of the adapter body 18B. The first biasing part 52B is provided between the holding part 18C and the second wall 18B2 of the adapter body 18B. The holding part 18C is provided adjacent to the first wall 18B1 to prevent the first biasing part 52A from being unintentionally removed from the holding opening HS1. The holding part 18C is provided adjacent to the second wall 18B2 to prevent the first biasing part 52B from being unintentionally removed from the holding opening HS2.

Figure 15:
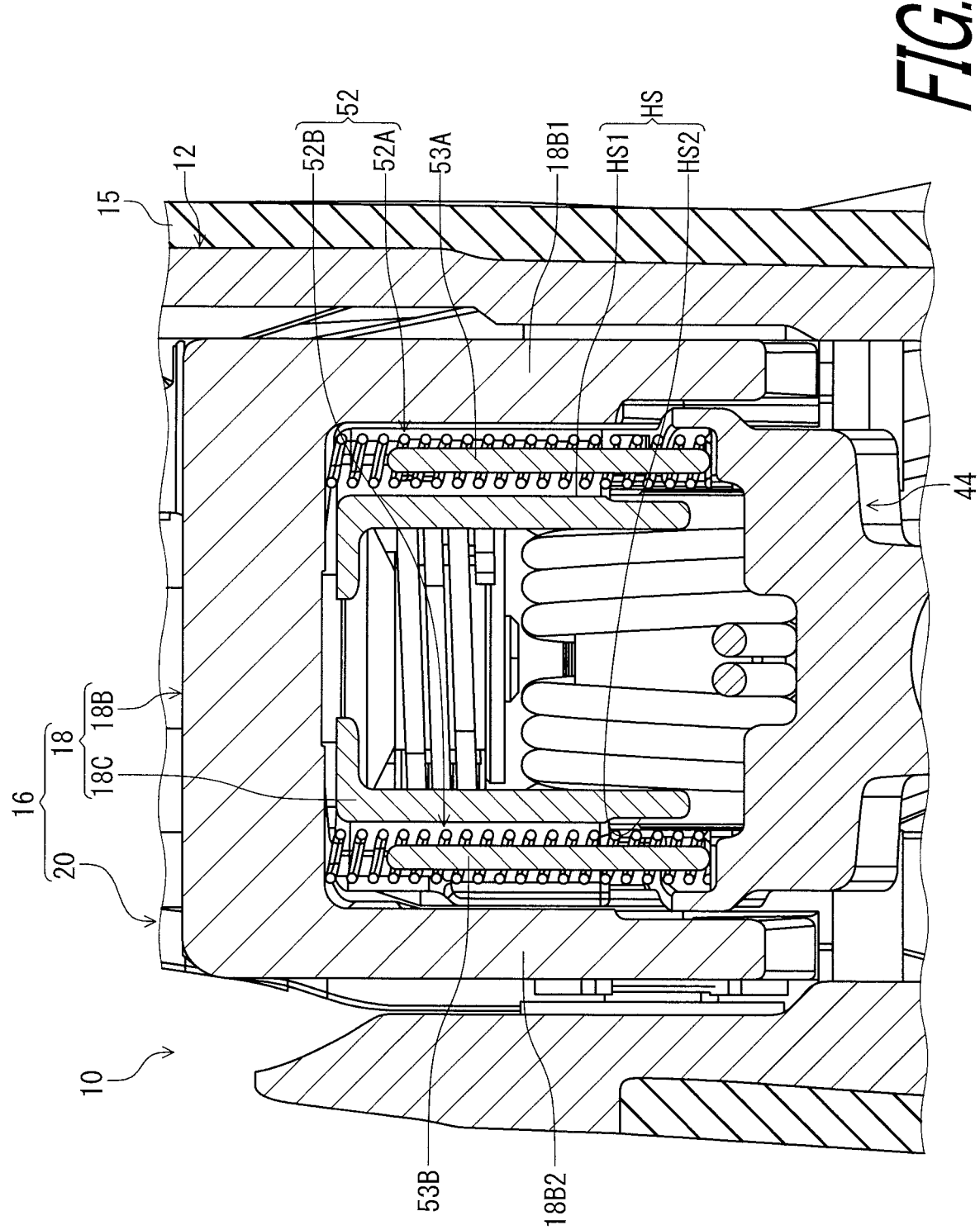
FIG. 15 is a cross-sectional view of the bicycle operating device taken along line XV-XV of FIG. 14.

As seen in FIG. 15, the bicycle operating device 10 further comprises restriction rods 53A and 53B. The restriction rod 53A is provided in the first biasing part 52A to restrict compression of the first biasing part 52A. The restriction rod 53B is provided in the first biasing part 52B to restrict compression of the first biasing part 52B. The restriction rods 53A and 53B can be omitted from the bicycle operating device 10.

Figure 16:
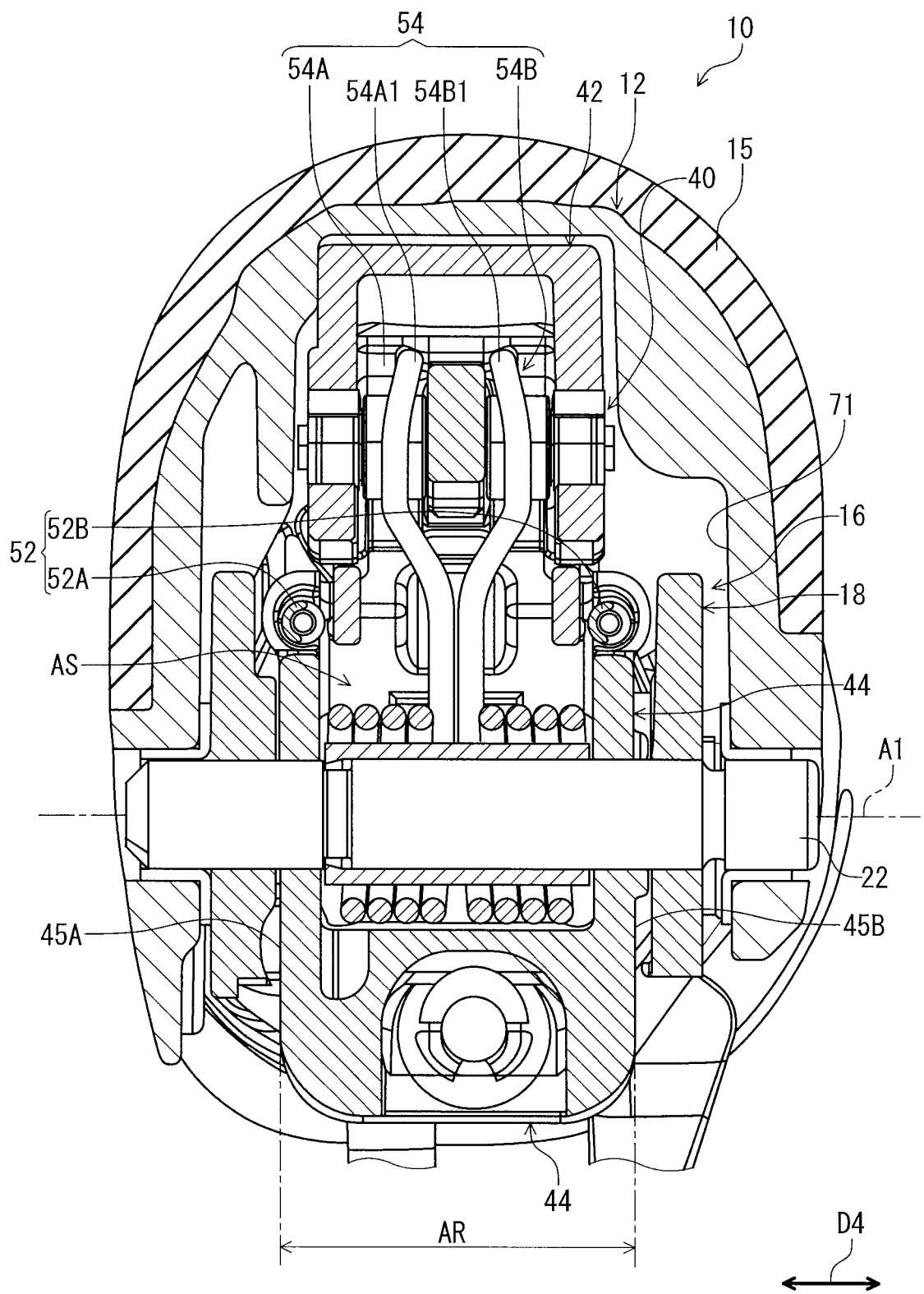
FIG. 16 is a cross-sectional view of the bicycle operating device taken along line XVI-XVI of FIG. 4.

As seen in FIG. 16, the bicycle operating device 10 further comprises a second biasing member 54 to bias the operating member 16 toward the rest position P11 (FIG. 1). The second biasing member 54 is mounted on the pivot shaft 22. In this embodiment, the second biasing member 54 includes a torsion spring. The second biasing member 54 includes second biasing parts 54A and 54B. For example, each of the second biasing parts 54A and 54B include a coiled spring. The second biasing parts 54A and 54B are mounted on the pivot shaft 22. A first end 54A1 of the second biasing part 54A is in contact with the guide pin 40. A first end 54B1 of the second biasing part 54B is in contact with the guide pin 40.

Figure 17:
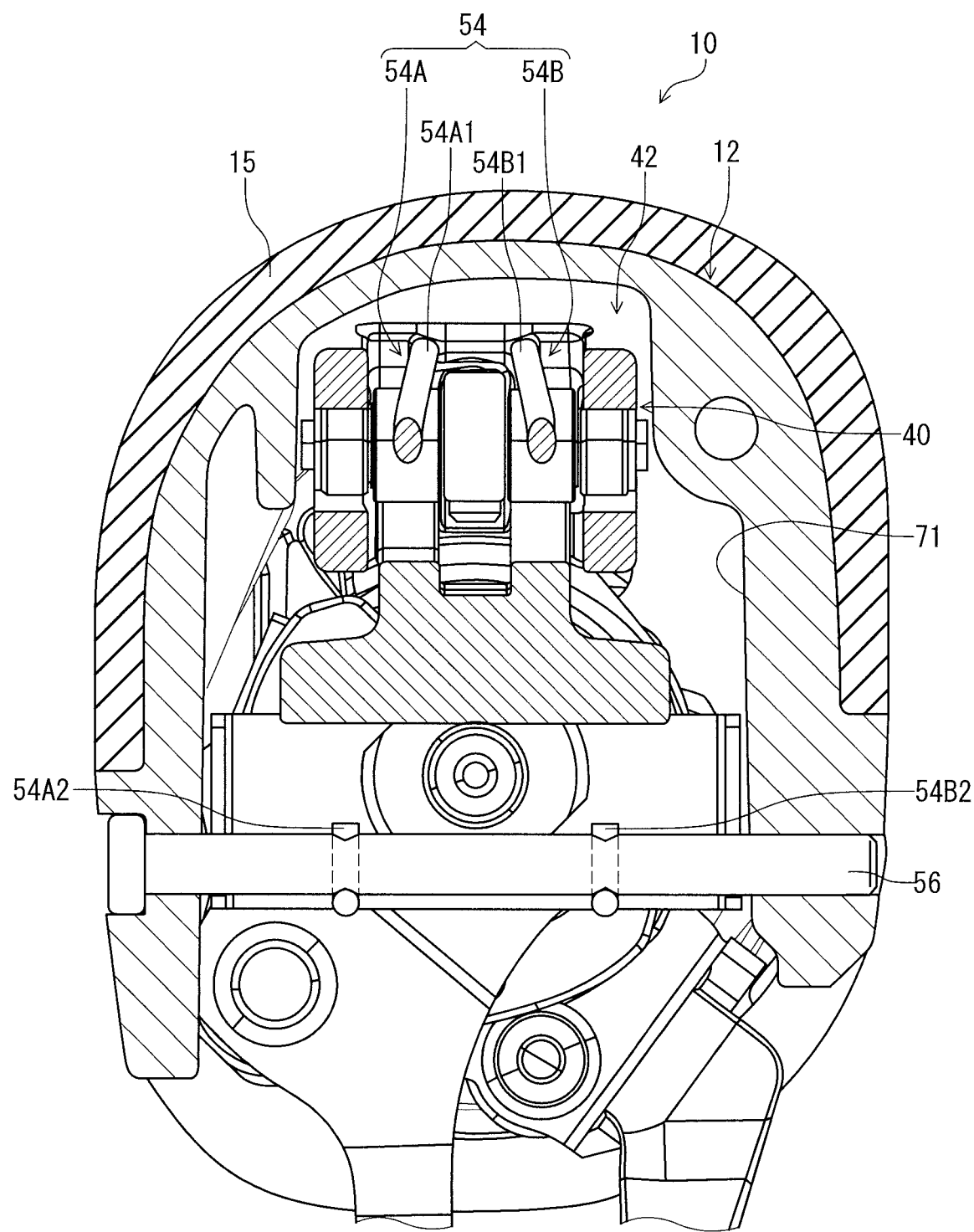
FIG. 17 is a cross-sectional view of the bicycle operating device taken along line XVII-XVII of FIG. 4.

As seen in FIG. 17, the bicycle operating device 10 comprises a support rod 56 secured to the base member 12. A second end 54A2 of the second biasing part 54A is received by the support rod 56. A second end 54B2 of the second biasing part 54B is received by the support rod 56.

As seen in FIG. 8, the transmitting member 44 is pressed by the second biasing member 54 against the additional adjustment member 50. The additional adjustment member 50 and the second biasing member 54 position the operating member 16 at the rest position P11 (FIG. 1). Furthermore, the second biasing member 54 biases the piston 32 toward the initial position P41 (FIG. 4). The additional adjustment member 50 and the second biasing member 54 position the piston 32 at the initial position P41 (FIG. 4).

As seen in FIG. 4, rotation of the adjustment member 46 relative to the transmitting member 44 changes a position of the operating member 16 relative to the transmitting member 44. This changes the rest position P11 of the operating member 16 without changing the initial position P41 of the piston 32. Rotation of the additional adjustment member 50 changes a position of the transmitting member 44 relative to the base member 12. This changes the initial position P41 of the piston 32 and further changes the rest position P11 of the operating member 16.

As seen in FIG. 16, the transmitting member 44 includes a first outer surface 45A and a second outer surface 45B provided on a reverse side of the first outer surface 45A in an axial direction D4 parallel to the pivot axis A1. The second biasing member 54 is provided in an axial area AR defined between the first outer surface 45A and the second outer surface 45B in the axial direction D4. The transmitting member 44 includes an axial space AS provided between the first outer surface 45A and the second outer surface 45B in the axial direction D4. The second biasing member 54 is provided in the axial space AS. The second biasing parts 54A and 54B are provided in the axial space AS.

Figure 18:
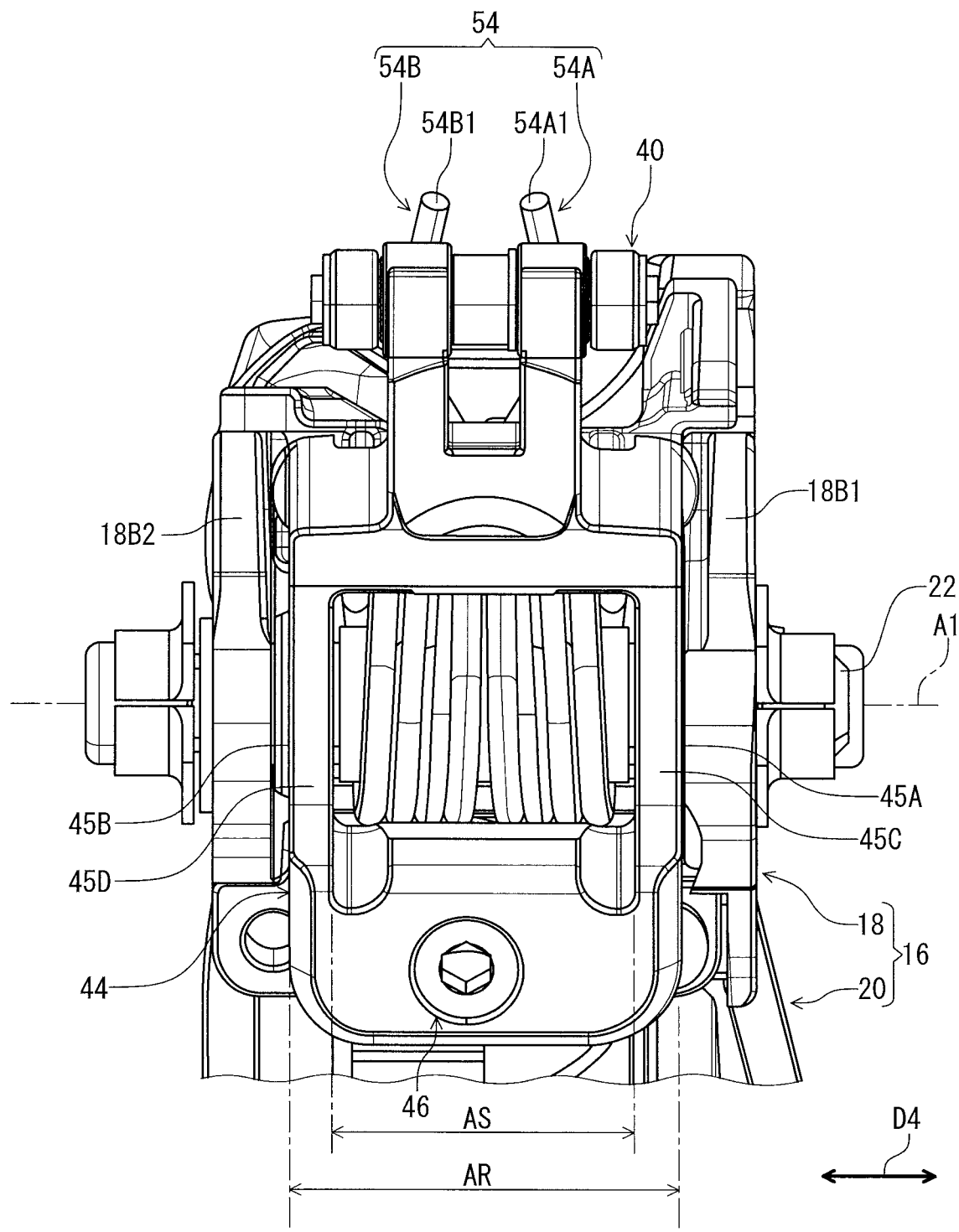
FIG. 18 is a rear view of the operating member and a surrounding structure of the operating member of the bicycle operating device illustrated in FIG. 1.

As seen in FIG. 18, the transmitting member 44 includes a first transmitting wall 45C and a second transmitting wall 45D. The first transmitting wall 45C and the second transmitting wall 45D are spaced apart from each other to define the axial space AS between the first transmitting wall 45C and the second transmitting wall 45D in the axial direction D4. The second biasing member 54 (the second biasing parts 54A and 54B) is provided between the first transmitting wall 45C and the second transmitting wall 45D in the axial direction D4. The second biasing part 54A includes a coiled portion 54A3. The second biasing part 54B includes a coiled portion 54B3. The coiled portions 54A3 and 54B3 are provided between the first transmitting wall 45C and the second transmitting wall 45D in the axial direction D4.

As seen in FIG. 4, the bicycle operating device 10 comprises a third biasing member 58 to bias the operating lever 20 toward the first rest position P21 (FIG. 3) relative to the adapter 18. The third biasing member 58 is mounted on the operating shaft 24. For example, the third biasing member 58 includes a torsion spring.

Figure 19:
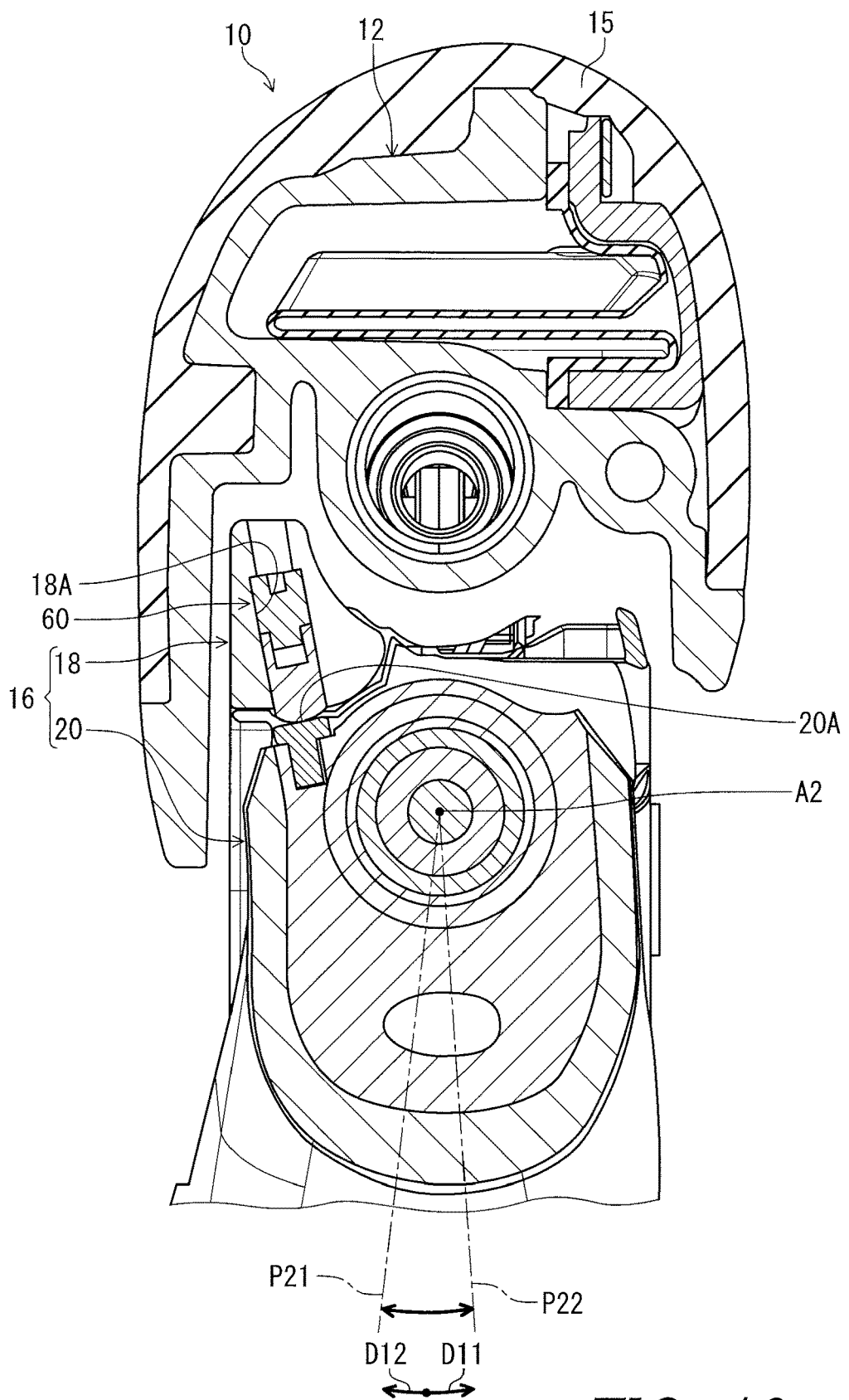
FIG. 19 is a cross-sectional view of the bicycle operating device taken along line XIX-XIX of FIG. 4.

As seen in FIG. 19, the adapter 18 positions the operating lever 20 at the first rest position P21. In this embodiment, the bicycle operating device 10 comprises an adjustment part 60 attached to the adapter 18 to change the first rest position P21 of the operating member 16 relative to the base member 12. The adjustment part 60 is in contact with a stopper surface 20A of the operating lever 20 to position the operating lever 20 at the first rest position P21. The adapter 18 includes a threaded-hole 18A threadedly engaged with the adjustment part 60. Rotation of the adjustment part 60 changes the first rest position P21 of the operating lever 20 relative to the adapter 18.

As seen in FIG. 4, the bicycle operating device 10 comprises a fourth biasing member 62 to bias the additional operating member 26 toward the second rest position P31 (FIG. 5) relative to the base member 12. In this embodiment, the fourth biasing member 62 biases the additional operating member 26 toward the second rest position P31 (FIG. 5) relative to the operating member 16 (the adapter 18). The fourth biasing member 62 is mounted on the operating shaft 24. For example, the fourth biasing member 62 includes a torsion spring. As seen in FIG. 5, the operating member 16

(the operating lever 20) is in contact with the additional operating member 26 to position the additional operating member 26 at the second rest position P31.

Figure 20:
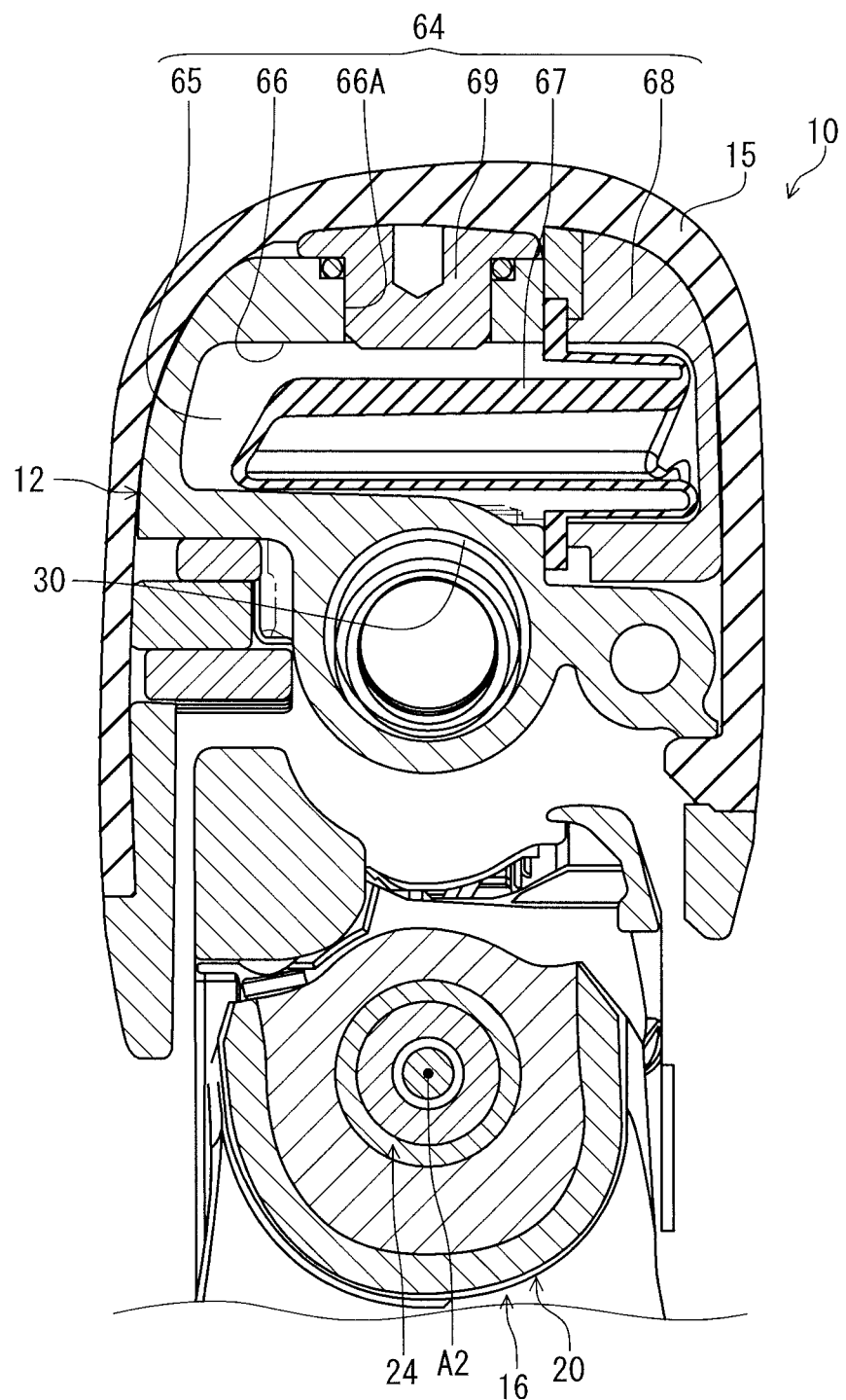
FIG. 20 is a cross-sectional view of the bicycle operating device taken along line XX-XX of FIG. 4.

As seen in FIG. 20, the hydraulic unit 28 comprises a hydraulic reservoir 64. The hydraulic reservoir 64 includes a reservoir chamber 65 connected to the hydraulic chamber 34. As seen in FIG. 4, the hydraulic reservoir 64 is provided at the first end portion 12A. In this embodiment, the hydraulic reservoir 64 is provided at the pommel portion 12E.

As seen in FIG. 20, the hydraulic reservoir 64 includes a reservoir recess 66, a diaphragm 67, and a lid 68. In this embodiment, the base member 12 includes the reservoir recess 66. The diaphragm 67 is at least partly disposed in the reservoir recess 66. The reservoir recess 66 and the diaphragm 67 define the reservoir chamber 65 in the reservoir recess 66. In this embodiment, the hydraulic reservoir 64 includes a bleed member 69. The base member 12 includes a bleeding hole 66A. The bleed member 69 is detachably attached to the base member 12 to close the bleeding hole 66A. The reservoir recess 66, the diaphragm 67, and the bleed member 69 define the reservoir chamber 65 in the reservoir recess 66. The reservoir chamber 65 is connected to the hydraulic chamber 34 via at least one connection holes (not shown). The hydraulic reservoir 64 can be omitted from the bicycle operating device 10.

As seen in FIG. 4, the bicycle operating device 10 comprises an operating structure 70. The operating structure 70 is provided between the first end portion 12A and the second end portion 12B. The operating structure 70 is provided in an accommodation space 71 of the base member 12. The operating structure 70 includes a rotatable member 72 rotatable relative to the base member 12 (FIG. 4) about a rotational axis A3 to control the bicycle component BC1. The rotatable member 72 is rotatable relative to the base member 12 (FIG. 4) about the rotational axis A3 to operate the shift device BC11. An end of the control cable C1 is coupled to the rotatable member 72. The operating structure 70 is configured to wind and position the control cable C1 in response to a pivotal movement of the operating member 16 from the first rest position P21 (FIG. 5) to the first operated position P22 (FIG. 5). The operating structure 70 is configured to unwind (release) and position the control cable C1 in response to a pivotal movement of the additional operating member 26 from the second rest position P31 (FIG. 5) to the second operated position P32 (FIG. 5). The operating structure 70 includes a structure which has been known in the bicycle field. Thus, it will not be described in detail here for the sake of brevity. The structure of the operating structure 70 is not limited to this embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base structure;
   an operating member pivotally coupled to the base structure about a pivot axis, the operating member being pivotable relative to the base structure about the pivot axis between a rest position and an operated position;
   an adjustment member attached to one of the base structure and the operating member to change the rest position of the operating member relative to the base structure;
   a receiving member provided to the other of the operating member and the base structure to be movable with the adjustment member in response to a pivotal movement of the operating member relative to the base structure, the receiving member including a contact surface and a groove recessed within the contact surface, a surface of the adjustment member being contactable with the contact surface; and
   an elastic member received within the groove, the elastic member being provided between the adjustment member and the receiving member to keep a clearance between the adjustment member and an entirety of the receiving member in a rest state where the operating member is in the rest position.

2. The bicycle operating device according to claim 1, wherein
   the elastic member is configured to deform so as to bring the adjustment member and the receiving member in contact with each other in an operated state where the operating member is in the operated position.

3. The bicycle operating device according to claim 1, further comprising:
   a first biasing member to bias the adjustment member toward the receiving member.

4. The bicycle operating device according to claim 3, wherein
   the first biasing member includes first biasing parts to bias the adjustment member toward the receiving member.

5. The bicycle operating device according to claim 3, wherein
   the operating member includes an adapter and an operating lever,
   the adapter is pivotally coupled to the base member about the pivot axis,
   the operating lever is pivotally coupled to the adapter about an additional pivot axis, the adapter includes a holding space, and the first biasing member is provided in the holding space.

6. The bicycle operating device according to claim 1, wherein the one of the base structure and the operating member includes a first threaded hole, and the adjustment member includes an adjustment screw rotatably provided in the first threaded hole.

7. The bicycle operating device according to claim 6, wherein the adjustment screw is made of a metallic material.

8. The bicycle operating device according to claim 1, further comprising:

a piston, wherein the base structure includes a base member including a cylinder bore, the piston being movably provided in the cylinder bore, and a transmitting member movably coupled to the base member to transmit the pivotal movement of the operating member to the piston, and the adjustment member is attached to the transmitting member.

9. The bicycle operating device according to claim 8, wherein the transmitting member is pivotable relative to the base member and the operating member about the pivot axis.

10. The bicycle operating device according to claim 8, further comprising:

a first biasing member provided between the operating member and the transmitting member to bias the adjustment member toward the receiving member.

11. The bicycle operating device according to claim 10, wherein the first biasing member includes first biasing parts each provided between the operating member and the transmitting member to bias the adjustment member toward the receiving member.

12. The bicycle operating device according to claim 10, wherein the operating member includes an adapter and an operating lever, the adapter is pivotally coupled to the base member about the pivot axis, the operating lever is pivotally coupled to the adapter about an additional pivot axis, and the first biasing member is provided between the adapter and the transmitting member to bias the adjustment member toward the receiving member.

13. The bicycle operating device according to claim 1, further comprising:

a second biasing member to bias the operating member toward the rest position.

14. The bicycle operating device according to claim 13, further comprising:

a pivot shaft pivotally coupling the operating member to the base structure about the pivot axis, wherein the second biasing member is mounted on the pivot shaft.

15. The bicycle operating device according to claim 13, further comprising:

a piston, wherein the base structure includes a base member including a cylinder bore, the piston being movably provided in the cylinder bore, and a transmitting member pivotally coupled to the base member about the pivot axis to transmit the pivotal movement of the operating member to the piston, the transmitting member including a first outer surface and a second outer surface provided on a reverse side of the first outer surface in an axial direction parallel to the pivot axis, and the second biasing member is provided in an axial area defined between the first outer surface and the second outer surface in the axial direction.

16. The bicycle operating device according to claim 15, wherein the transmitting member includes an axial space provided between the first outer surface and the second outer surface in the axial direction, and the second biasing member is provided in the axial space.

17. The bicycle operating device according to claim 1, wherein the operating member includes an adapter and an operating lever, the adapter is pivotally coupled to the base member about the pivot axis, the operating lever is pivotally coupled to the adapter about an additional pivot axis, and the receiving member is attached to the adapter and is a separate member from the adapter.

18. The bicycle operating device according to claim 1, wherein the base structure includes a base member, and the base member includes a first end portion configured to be coupled to a bicycle handlebar in a mounting state where the bicycle operating device is mounted to the bicycle handlebar, and a second end portion opposite to the first end portion, and the operating member is provided between the first end portion and the second end portion.

19. The bicycle operating device according to claim 18, wherein the first end portion includes a mounting surface having a curved shape corresponding to a drop-down handlebar.

20. The bicycle operating device according to claim 18, wherein the base member includes a grip portion arranged between the first end portion and the second end portion.

21. The bicycle operating device according to claim 18, wherein the second end portion includes a pommel portion.

* * * * *